(12) United States Patent
Yamazaki

(10) Patent No.: US 7,212,690 B2
(45) Date of Patent: May 1, 2007

(54) IMAGE READING APPARATUS AND IMAGE READING METHOD

(75) Inventor: Yoshirou Yamazaki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 498 days.

(21) Appl. No.: 10/703,434

(22) Filed: Nov. 10, 2003

(65) Prior Publication Data

US 2004/0071370 A1    Apr. 15, 2004

Related U.S. Application Data

(63) Continuation of application No. 09/548,619, filed on Apr. 13, 2000, now Pat. No. 6,724,949.

(30) Foreign Application Priority Data

Apr. 14, 1999    (JP)    ................. 11-106484

(51) Int. Cl.
*G06K 9/20*    (2006.01)

(52) U.S. Cl. .................................... 382/312

(58) Field of Classification Search ............... 382/312, 382/314–315, 317–319, 321–324; 358/474, 358/500, 505, 527
See application file for complete search history.

(56) References Cited

U.S. PATENT DOCUMENTS

| | | |
|---|---|---|
| 4,903,310 A | 2/1990 | Takeo et al. |
| 5,751,451 A | 5/1998 | Ogoshi et al. |
| 5,933,189 A | 8/1999 | Nomura |
| 5,991,010 A | 11/1999 | Nishio |
| 6,316,761 B1 | 11/2001 | Yamaguchi |
| 6,330,083 B1 | 12/2001 | Nabeshima et al. |

*Primary Examiner*—Jose L Couso
(74) *Attorney, Agent, or Firm*—Sughrue Mion, PLLC

(57) ABSTRACT

An image reading device is provided which can read an image at a wide dynamic range and which can be constructed at low cost. Film images which are recorded on a photographic film undergo a preliminary reading by an area CCD. On the basis of the image data obtained from the reading, the density of each LCD cell of an LCD when performing the main scanning of the image can be calculated so that the amount of incident light on the area CCD is as great as possible without saturation of the accumulated charge in each photoelectric conversion cell occurring. The film image then undergoes the main reading with the density of each LCD cell of the LCD controlled so as to be the above calculated density.

9 Claims, 14 Drawing Sheets

F I G. 1
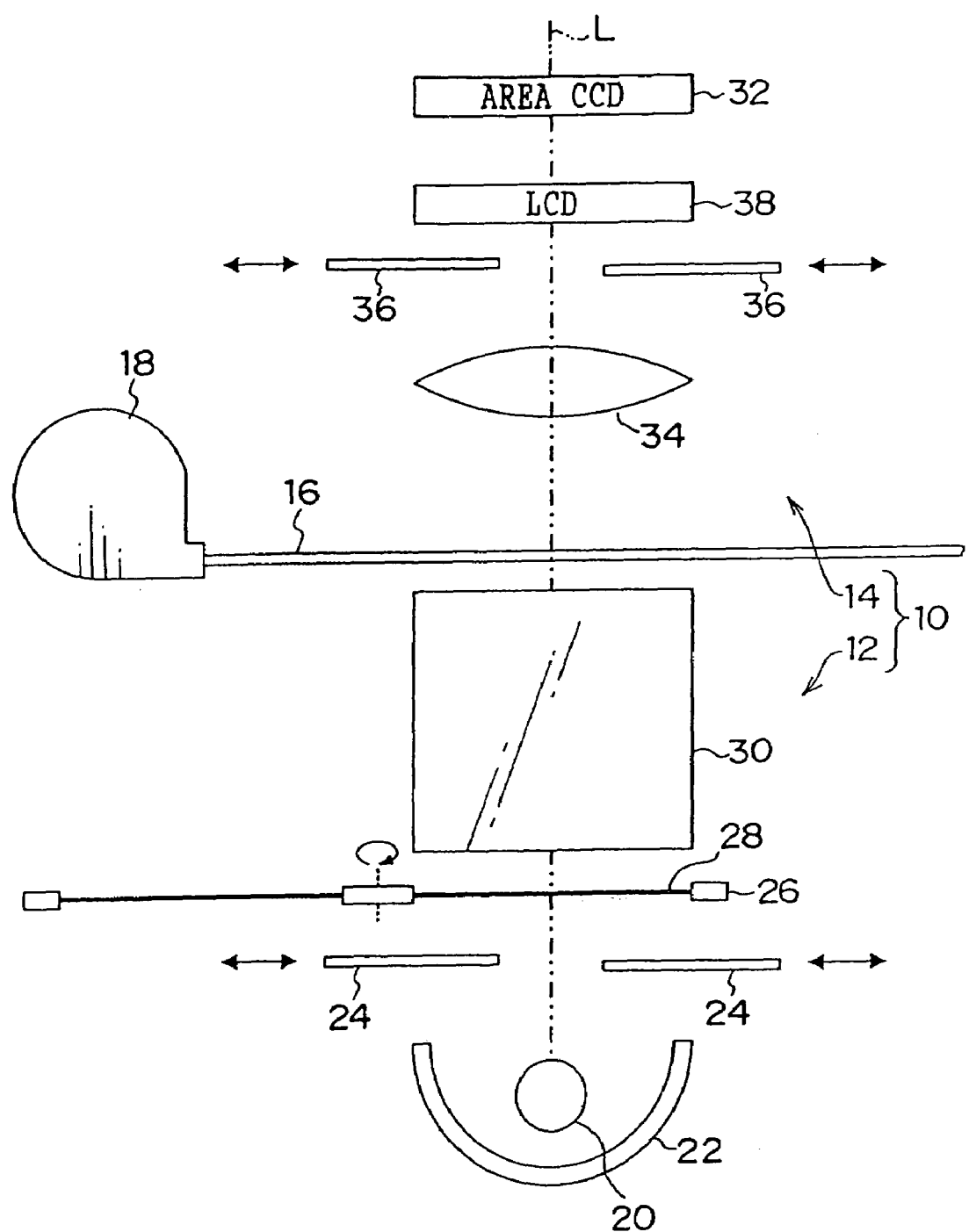

F I G. 8
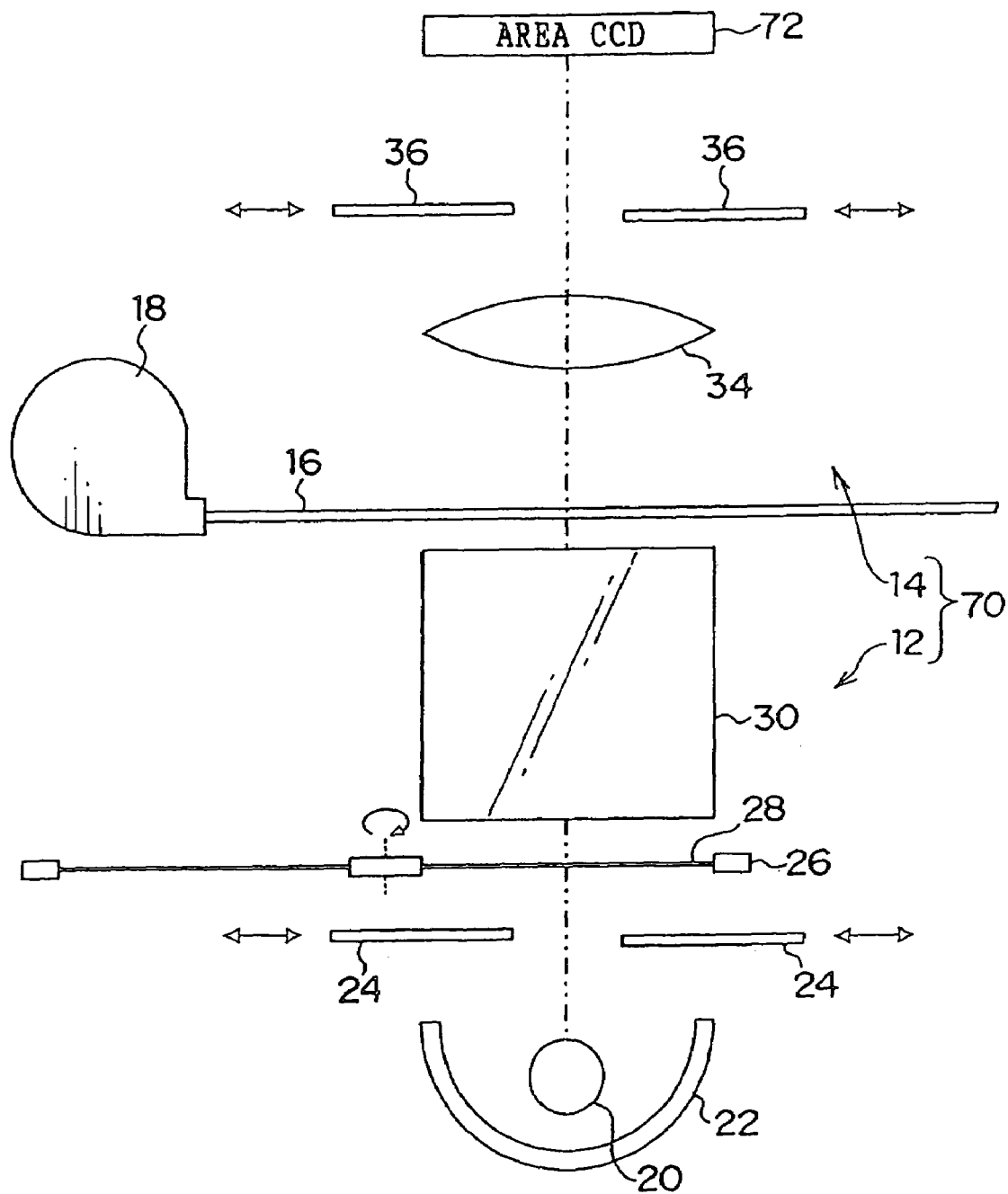

F I G. 9
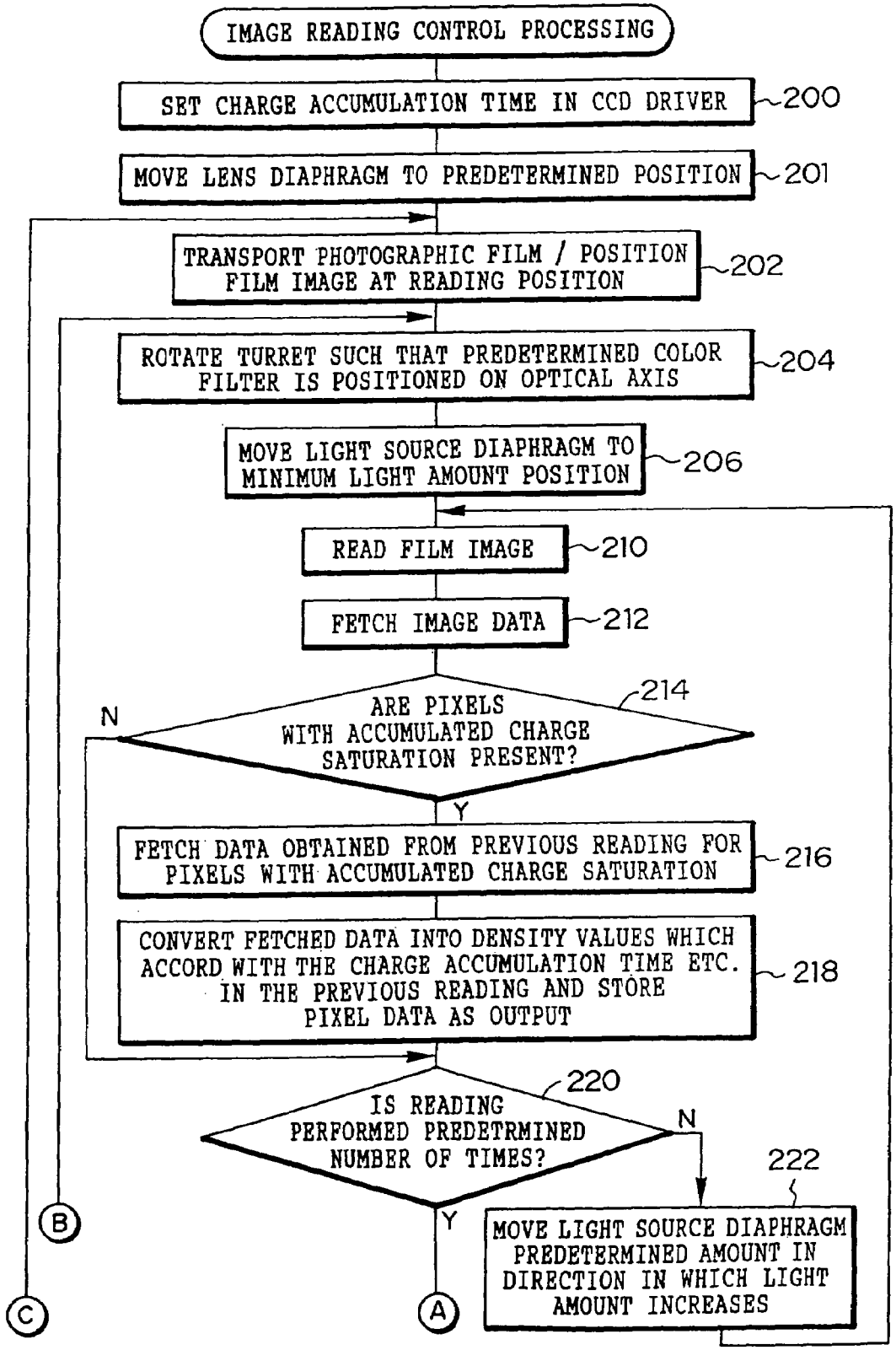

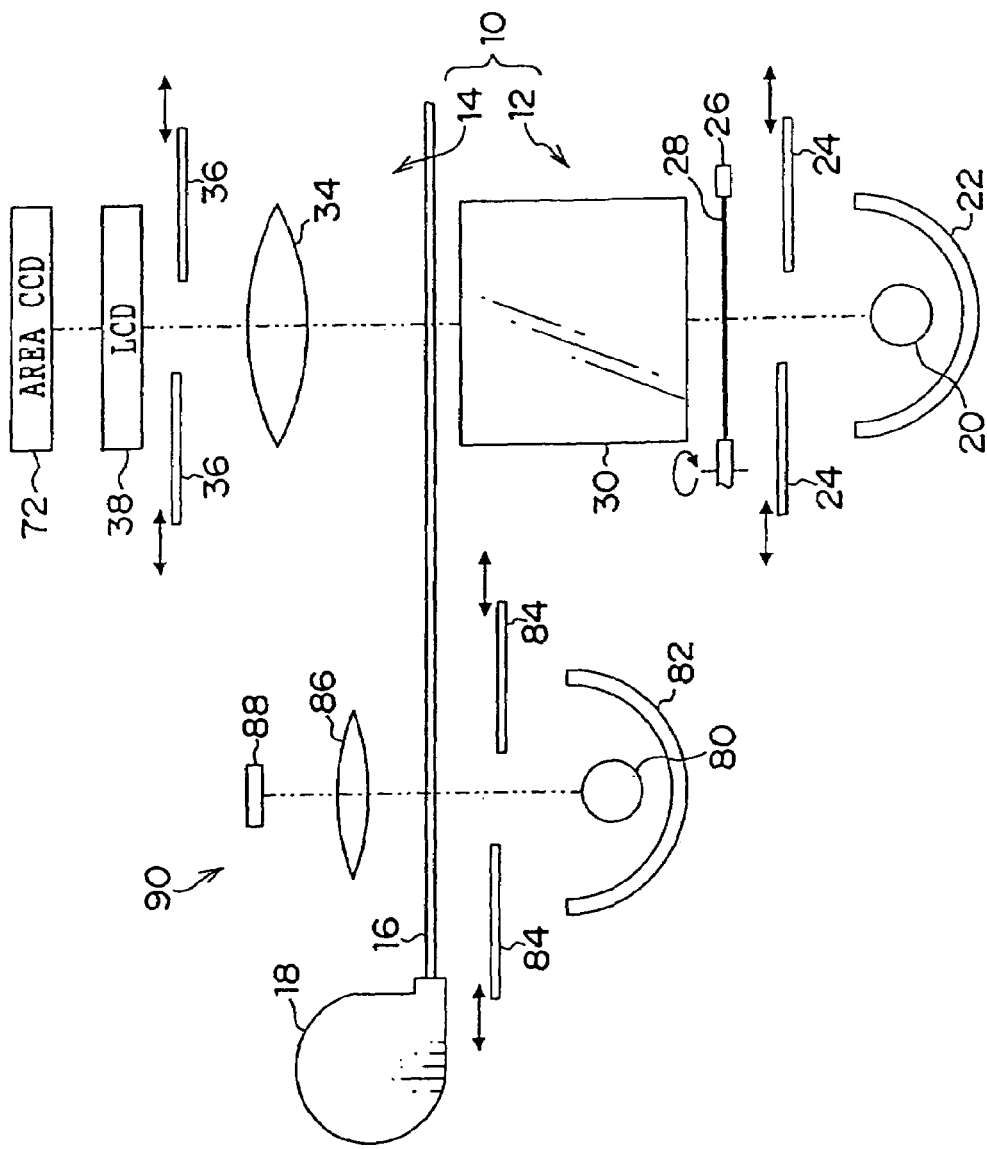

F I G. 1 3
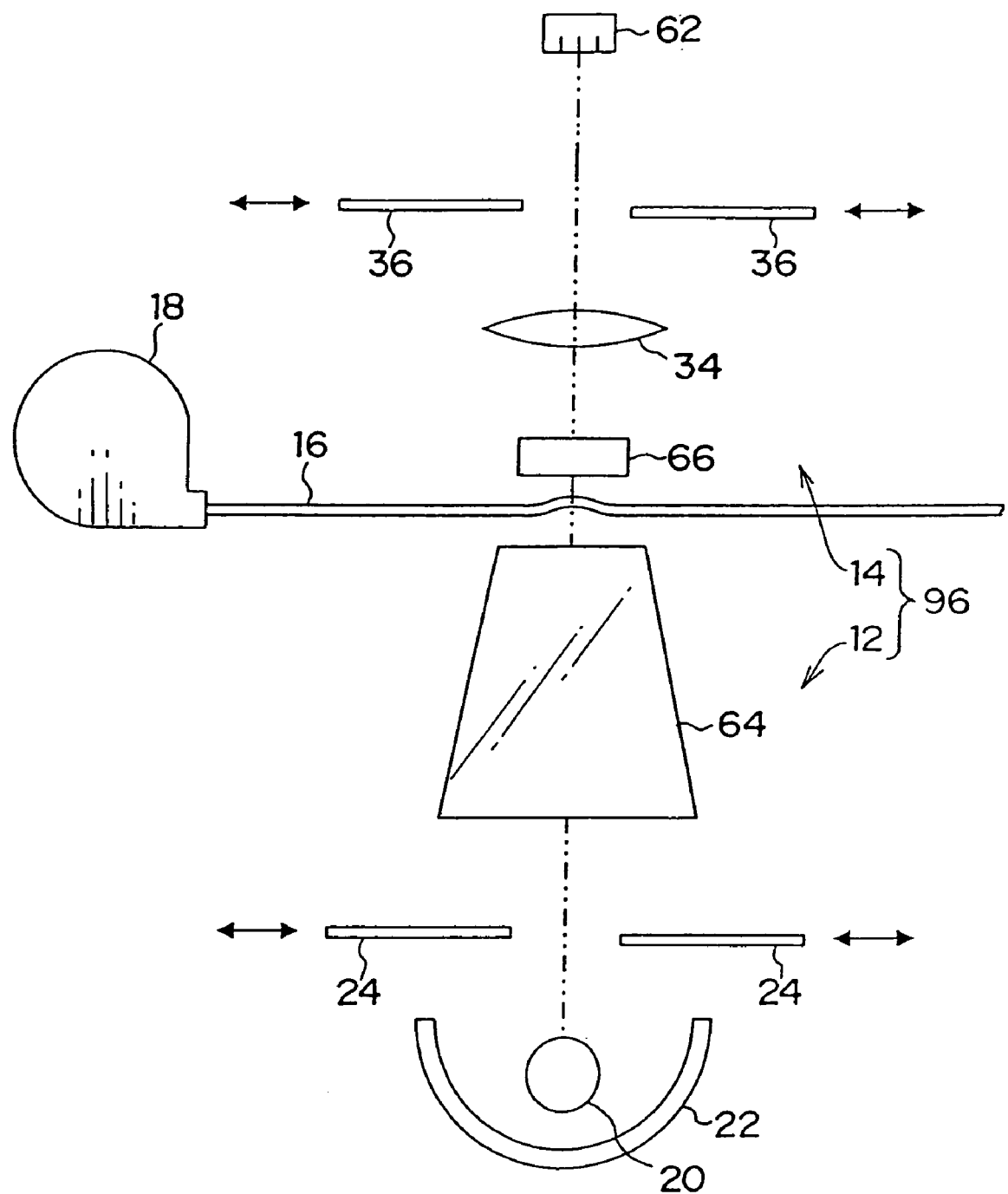

IMAGE READING APPARATUS AND IMAGE READING METHOD

This is a continuation of application Ser. No. 09/548,619 filed Apr. 13, 2000 now U.S. Pat. No. 6,724,949, the disclosure of which is incorporated herein by reference.

BACKGROUND OF THE INVENTION

1. Field of the Invention

The present invention relates to an image reading apparatus and an image reading method and, in particular, to an image reading method in which an image is read by photoelectrically converting incident light from the image in units of single pixels when the image to be read has been divided into a plurality of pixels and to an image reading apparatus in which the above image reading method can be applied

2. Description of the Related Art

Conventionally, an image scanner is known in which an image is read (i.e. image data representing density values of each pixel in an image) in the following manner. Light emitted from a light source and transmitted through an image recorded on a photographic film or the like is measured (photoelectrically converted) in units of single pixels by a charge accumulation sensor (for example, a CCD). Photometric signals output from the CCD through an electronic circuit constructed so as to include an amplification circuit are then amplified and the amplified photometric signals are converted into digital data by an A/D converter.

In this type of scanner, generally (in the first reading method), the amount of light from the light source is adjusted (the amount of light for each component color is adjusted for a color scan) so that photometric values obtained from incident light when no photographic film has been set in place substantially conform to the maximum photometric value and so that no saturation of the values occurs. The amplification factor of the amplification circuit for amplifying the photometric signals output from the CCD is also adjusted and, image reading is performed after the CCD charge accumulation time has been adjusted (this is sometimes adjusted for each component color in a color scan).

In the first reading method, the dynamic range DR of analog photometric signals output from the amplification circuit is found by $$DR = V\text{sat}/V\text{drk}$$

when Vsat is the maximum level and Vdrk the black level of the photometric signals. In order to read an image at a wider dynamic range, the black level Vdrk may be reduced and the maximum level Vsat increased, however, the black level Vdrk, in particular, is dependent on: (1) the dark current output from the CCD; (2) noise output from the CCD; (3) the drift of the amplification circuit; and (4) noise output from the amplification circuit. Consequently, the above (1) to (4) are factors that inhibit the widening of the dynamic range when reading a photographic film. (1) and (3) out of the above (1) to (4) can be substantially removed by correcting the dark current (i.e. by correcting the level of the photometric signals by the amount of the difference between the ideal level of the photometric signals when reading optical black (normally 0) and the actual level thereof.

When dark current correction is performed, because the black level Vdrk is replaced by the noise level of the CCD and the amplification circuit Vnoi, the dynamic range of the photometric signals is found by $$DR = V\text{sat}/V\text{noi}$$

Accordingly, in order to widen the dynamic range of a reading in a scanner with the above structure, it is necessary to reduce (2) the noise output from the CCD and (4) the noise output from the amplification circuit in addition to performing dark current correction. Thus it is necessary to use a CCD having low noise and high performance and to design an amplification circuit also having low noise. The problem is thus that costs are high.

Moreover, when the analog section of a scanner having a CCD and an amplification circuit is designed to have a wide dynamic range, it is also necessary to use an A/D converter which separates and converts the level of input signals into multibit data as the A/D converter for converting photometric signals into digital data. However, the cost of the A/D converter increases the greater the number of multibits. In particular, when dealing with image data comprising a plurality of pixels such as that from an image scanner, high speed analog digital conversion is demanded. As a result, the analog digital converter ends up being extremely expensive. Accordingly, currently, the specifications of each section of an image scanner are determined so that the widest dynamic range possible under the constraints of cost is obtained. Consequently, the performance of the scanner (i.e. the photometric dynamic range and the image reading speed possible from the analig—digital conversion speed) is not always satisfactory.

Further, high performance negative scanners are also known which read negative images with a high level of accuracy by separating negative images recorded on a color negative film into a plurality of pixels (for example, 1000 pixels) and separating each pixel into each component color and measuring the light thereof in order to determine exposure conditions used when a photograph printer exposes the images onto a photosensitive material such as photographic paper or the like. In this type of high performance negative scanner, the light of each negative image is preliminarily measured under photometric conditions in which it is certain that saturation will not occur (prescan) and the density of the lowest density pixel in the negative image is detected. A main photomeasurement (fine scan) is then performed in which the charge accumulation time of the CCD is adjusted for each of the negative images (adjusted for each component color in a color scan) so as to be the longest possible time without the output being saturated by the light from the lowest density pixels, thus ensuring the maximum dynamic range (second reading method).

In the second reading method, often the density of the lowest density pixel is comparatively high relative to, for example, an over exposed negative image which has high density. Therefore, the charge accumulation time for a fine scan is adjusted so as to be long. Moreover, often the density of the lowest density pixels is comparatively low (namely, is close to or identical to the film base density) relative to an under exposed negative image which has a low density. Therefore, the charge accumulation time for a fine scan is also adjusted so as to be short.

Because the gradient of the change in the density relative to the change in the exposure amount in a negative film is small ($\gamma \ll 1$), the gradation of a negative image is a soft gradation and the contrast of the negative image is low. Moreover, because the above high performance negative scanner uses a CCD having a comparatively rough photometric point density (pixel density), the contrast of the light incident on the CCD from each pixel of the negative image becomes still lower. As a result, by adjusting the charge accumulation time in accordance with the density of the low density pixels, as in the second reading method, negative images of any state of exposure type (over exposed negative images/normally exposed negative images/under exposed negative images) can each be read at a wide dynamic range.

However, in the second reading method, reading negative images having high contrast at a wide dynamic range such as negative images of scenes photographed using reverse light, negative images photographed using strobe lighting, and negative images in which light sources are contained in the image is difficult. Moreover, the dynamic range of the reading is also insufficient when reading images recorded on reversal film which has a large gradient of the change in the density relative to the change in the exposure amount ($\gamma \approx 1$), or when making high accuracy readings of images which have been separated into a plurality of pixels (for example, several hundreds of thousands of pixels). This is because the contrast of the light incident on the CCD from each pixel of the image is extremely high.

SUMMARY OF THE INVENTION

The present invention has been achieved in order to solve the above problems. It is an object of the present invention to provide a low cost image reading apparatus and image reading method which make possible the reading of an image at a wide dynamic range.

In order to achieve the above objectives, in the image reading apparatus according to the first aspect of the present invention, there is provided: a reading apparatus for reading an image in units of single pixels, after the image to be read has been separated into a plurality of pixels, by photoelectrically converting incident light from the image; determination device for determining suitable reading conditions for the image for each pixel or for each of small areas comprising a plurality of pixels, based on the result of the image reading; and a control apparatus for performing, based on the result of the determination by the determination device, a control process so that output image data identical to the image data obtained if each pixel or each small area of the image were read under the reading conditions determined to be suitable for each is obtained from the results of the image reading by the reading apparatus.

The reading apparatus according to the first aspect reads an image in units of single pixels, after the image to be read has been separated into a plurality of pixels, by photoelectrically converting incident light from the image. Note that, the reading apparatus can also be structured so as to include, for example, a reading sensor provided with a plurality of cells which reads the image with each cell by photoelectrically converting incident light from the image to be read (for example, a charge accumulation type reading sensor which accumulates signal charges obtained by photoelectric conversion). Note also that the incident light from the image being read may be light transmitted through the image or light reflected from the image.

In the reading of the image by the reading apparatus, when the amount of incident light (alternatively, the integral value of the amount of incident light within a reading period) is too great compared to the sensitivity of the reading apparatus, the reading accuracy is decreased due to saturation of the photoelectric conversion output. When the amount of incident light is too small compared to the sensitivity of the reading apparatus, the reading accuracy is decreased due to the photoelectric conversion output being too small. Consequently, when considering the dynamic range of a reading, it is desirable that the reading conditions are controlled so that the amount of incident light is as large as possible without being so large as to cause saturation of the photoelectric conversion output. However, because the density values or luminance values of the image being read vary from pixel to pixel or from small area to small area, they also differ for each pixel in an image with regard to the suitable reading conditions.

To counter this, the determination device of the first aspect, determines suitable reading conditions for the image for each pixel or for each small area comprising a plurality of the pixels of the image, based on a result of reading the image. Note that the result of a preliminary reading of the image being read by the reading apparatus (known as a prescan) may be used for the above result of reading the image. Alternatively, when the determination device is structured so as to include an image reading apparatus separate to the reading apparatus, the result of reading the image by the image reading apparatus (prescan) may be used for the above result of reading the image. Moreover, as will be described in the tenth aspect, it is also possible to use the results when the image is read a plurality of times by a reading apparatus under different reading conditions.

Furthermore, the reading conditions can include at least one of a physical amount relating to the sensitivity of the reading apparatus (for example, the length of time of the reading by the reading apparatus (corresponding to the charge accumulation time in a charge accumulation type image sensor: even if the amount of incident light is constant, because the value of the output of the reading apparatus changes due to the length of time of the reading, the sensitivity of the reading apparatus appears to change)) and a physical amount relating to the amount of incident light. It is also possible to obtain the suitable reading conditions by calculating and setting values representing the suitable reading conditions for the image as the values of the above physical amounts.

The control apparatus of the first aspect performs, based on the result of the determination by the determination device, a control process so that output image data identical to when each pixel or each small area of the image is read under the reading conditions determined to be suitable for each is obtained from the results of the image reading by the reading apparatus.

The control process for obtaining the above output image data can be achieved by, in the second aspect, for example, controlling the reading apparatus such that, when the reading apparatus is structured such that the reading conditions can be varied between units of pixels or small areas comprising a plurality of pixels, the reading conditions for each pixel or for each small area during the image reading by the image reading apparatus each match the suitable reading conditions determined by the determining means. As a result, in a single image reading by the reading apparatus, the image being read is read under suitable reading conditions both for pixel units and for small area units. The results of the reading by the reading apparatus can be used as output image data.

The control process for obtaining the above output image data can also be achieved by, as is described in the tenth aspect, for example, selecting for each pixel or each small area data which corresponds to the most suitable reading conditions determined by the determining means from the image data obtained from each of the plurality of image readings made under different reading conditions by the reading apparatus, and synthesizing this as output image data. In this case, the output image data which is equal to that when the image being read is read under suitable reading conditions for both pixels units and small area units is synthesized from the results of the plurality of image readings by the reading apparatus.

In the method described above, because output image data which is equal to that when the image being read is read under reading conditions determined as suitable for both pixels units and small area units (reading conditions in which the amount of incident light is as large as possible without saturation of the photoelectric conversion output occurring) is obtained, output image data equivalent to the result of the image being read at a wide dynamic range can be obtained even in cases such as when the image being read has a high level of contrast.

Moreover, in the first aspect, because output image data which is equal to that obtained when the image is read under reading conditions determined as suitable for both pixels units and small area units is obtained by selecting reading conditions in pixel units or small area units, an image reading apparatus with the equivalent of the dynamic range necessary for reading the image can be constructed at low cost without it being necessary to construct the reading apparatus with high cost sections such as low noise reading sensors.

The image reading apparatus according to the second aspect of the present invention comprises: reading means which reads the image by photoelectrically converting incident light from the image in units of single pixels when the image to be read has been separated into a plurality of pixels and which is able to change the image reading conditions in units of pixels or in units of small areas each comprising a plurality of pixels; determination device which determines suitable reading conditions for the image for each pixel or for each small area comprising a plurality of pixels based on a result of reading the image; and a control apparatus for performing control such that the reading conditions for each pixel or each small area during the image reading by the image reading apparatus match the suitable reading conditions determined by the determination device.

In the second aspect, the reading apparatus is able to change the image reading conditions for units of single pixels or for units of small areas comprising a plurality of pixels. The determination device determines suitable reading conditions for each pixel or each small area based on the result of the image reading. The control means performs control processing such that the reading conditions for each pixel or each small area during the image reading by the reading apparatus match each of the determined suitable reading conditions. As a result, in the same way as in the first aspect, it is possible to read an image at a wide dynamic range and to construct the image reading device cheaply.

Note that the construction of an image reading apparatus capable of altering the reading conditions of an image in units of single pixels or in units of small areas comprising a plurality of pixels can be achieved by including in the image reading apparatus a reading sensor for reading the image by photoelectrically converting each pixel of the incident light from the image, and an incident light amount alteration apparatus capable of altering the amount of incident light striking the reading sensor in pixel units or in small area units.

The incident light amount alteration apparatus can be constructed from, for example, a transmission light amount adjustment device such as an LCD which is provided with a plurality of cells and which is capable of altering at each cell the amount of transmission light or, alternatively, from a reflection light amount adjustment device such as a DMD (digital micromirror device) which is provided with a plurality of cells and which is capable of altering at each cell the amount of reflection light. By corresponding these cells to pixels or small areas and controlling the amount of transmission light or reflection light of the devices at each cell, the amount of incident light striking the reading sensor can be altered in units of single pixels or in units of small areas.

When the reading apparatus has the above structure, the control by the control apparatus of the reading conditions can be achieved by independently controlling the amount of incident light striking the reading sensor via the incident light amount alteration apparatus in units of single pixels or in units of small areas. The effect achieved by the third embodiment is that there is no longer any need to use as the reading sensor of the reading apparatus a structurally complicated reading sensor such as a charge accumulation type reading sensor capable of independently altering the charge accumulation time for units of single pixels or units of small areas.

The construction of a reading apparatus capable of altering the reading conditions of an image in units of single pixels or in units of small areas comprising a plurality of pixels can be achieved, as described, for example, in the sixth aspect of the present invention, by including in the image reading apparatus a charge accumulation type reading sensor for reading the image by photoelectrically converting incident light from the image for each pixel and accumulating this as a charge, and capable of independently altering the charge accumulation time for pixel units or for small area units.

When the reading apparatus has the above structure, the control of the reading conditions by the control apparatus is performed by independently controlling the charge accumulation time of the reading time for pixel units or for small area units. According to the sixth aspect, although the structure of the reading sensor is complicated, the incident light amount alteration apparatus described in the third aspect is no longer a necessary part when controlling the image reading conditions for pixels units or for small area units each of which comprises a plurality of pixels, thus allowing the number of parts to be reduced.

Moreover, the image reading apparatus according to the present invention is structured such that light other than from the image being read is also incident on the reading sensor (for example, is structured such that, when the image being read is recorded on a recording medium such as a photographic film, light which has passed through or been reflected from regions other than the regions where the image is recorded on the photographic film is also incident of the reading sensor). In particular, when the amount of incident light other than from the image being read is greater than the amount of incident light from the image being read, if the reading sensor is, for example, a charge accumulation type reading sensor, then the incident light other than from the image being read has an adverse effect on the image reading, such as the charge accumulated in the reading sensor from the incident light other than from the image being read being saturated.

It is possible to prevent the incident light other than from the image being read having an adverse effect on the reading by, for example, shutting out incident light other than from the image being read using a mask or the like. However, as in the third aspect, in an aspect in which a second reading apparatus is constructed so as to have an incident light amount alteration means and a second control apparatus controls the reading conditions by controlling the amount of incident light incident on the reading sensor in units of pixels or small areas using the incident light amount alteration apparatus, then, as described in the fourth aspect, it is preferable that the second control apparatus controls the amount of incident light on the reading sensor in units of pixels or small areas using the incident light amount alteration apparatus such that the amount of incident light other than from the image being read from among the incident light incident on the reading sensor is below a predetermined value.

In contrast, in the sixth aspect of the present invention, in an aspect in which the second reading apparatus is structured so as to include a charge accumulation type reading sensor capable of altering the charge accumulation times for stand-alone pixel units or small area units, and the second control apparatus controls the reading conditions by controlling the charge accumulation time of the reading sensor in stand-alone units of pixels or small areas, then, as described in the seventh aspect, it is preferable that the second control apparatus controls the charge accumulation time of the reading sensor in units of pixels or small areas such that the charge accumulation time in the photoelectric conversion of incident light other than from the image being read from among the incident light incident on the reading sensor is below a predetermined value.

By controlling the charge accumulation time or incident light amount as described above, there is no need to make the structure more complex such as by providing a mask for shutting out incident light other than from the image being read and incident light other than from the image being read can be prevented from having an adverse effect on the reading of the image.

Further, irregularities in pixel units which are caused by the image reading apparatus are sometimes generated in the results of an image reading by the reading sensor. Examples of the causes of these irregularities are unevenness in the amount of light illuminating the image being read; aberration in the optical system irradiating the light from the image onto the reading sensor; and irregularities in the sensitivity for each pixel of the reading sensor. Moreover, when the image being read is one that has been made visible by performing developing processing and the like on a photographed object which has been recorded on a photographic film by photography using a camera, density unevenness in the image being read is generated due to aberrations in the optical system of the camera. Therefore, aberrations in the optical system of the camera are also a cause of irregularities in pixel units in the results of an image reading by a reading sensor.

It is possible to avoid irregularities in pixel units in the results of an image reading by a reading sensor by, for example, performing a correction processing to correct the image reading results in units of each pixel. However, as in the third aspect, in an aspect in which the second reading apparatus is constructed so as to include an incident light amount alteration apparatus and the second control apparatus controls the reading conditions by controlling the amount of incident light on the reading sensor in units of pixels or small areas using the incident light amount alteration apparatus, then, as described in the fifth aspect, it is preferable that the second control apparatus controls the reading conditions by controlling the amount of incident light on the reading sensor in units of pixels or small areas using the incident light amount alteration apparatus such that density unevenness in an image being read and irregularities in each pixel unit in the results of an image reading by a reading sensor caused by the image reading apparatus are corrected.

In contrast, as in the sixth aspect of the present invention, in an aspect in which the second reading apparatus is constructed so as to include a charge accumulation type reading sensor capable of altering the charge accumulation time for stand-alone units of pixels or small areas, and the second control apparatus controls the reading conditions by controlling the charge accumulation time of a reading sensor in stand-alone units of pixels or small areas, then, as described in the eighth aspect, it is preferable that the second control apparatus controls the reading conditions by controlling the charge accumulation time of a reading sensor in units of pixels or small areas such that density unevenness in an image being read and irregularities in each pixel unit in the results of an image reading by a reading sensor caused by the image reading apparatus are corrected.

By controlling the charge accumulation time or incident light amount as described above, it is possible to avoid irregularities in pixel units in the results of an image reading and there is no need to perform correction processing on the results of the image reading for each pixel unit.

Note that, in the third and fourth aspects, it is also possible, as is described in the ninth aspect, to construct the reading apparatus such that it contains a light amount adjustment apparatus capable of adjusting the amount of light of at least one of illumination light illuminating an image and incident light incident onto a reading sensor from an image. In this case, the control apparatus is able to control the reading conditions by controlling the amount of light of at least one of illumination light and incident light via the light amount adjustment apparatus.

The light amount adjustment apparatus may be formed from a diaphragm, a light reduction filter, or the like, and, generally, these optical parts are provided in the structure of an image reading apparatus. Accordingly, according to the ninth aspect of the present invention, by controlling the light amount via a light amount adjustment apparatus, it is possible to reduce the width of the alteration of the incident light by the incident light amount alteration apparatus described in the third aspect, or to reduce the width of the alteration of the charge accumulation time by the reading sensor described in the sixth aspect. In addition, an increase in the number of parts can be avoided by using a diaphragm or light reduction filter already present in the apparatus as the light amount adjustment apparatus.

The image reading apparatus according to the tenth aspect of the present invention comprises: a reading apparatus which is provided with a light amount adjustment apparatus capable of adjusting the amount of light of at least one of illumination light illuminated onto an image being read and incident light from the image, and which reads the image a plurality of times by photoelectrically converting incident light incident from the image in units of single pixels when the image has been divided into a plurality of pixels and also causes the reading conditions to be varied for each reading by adjusting the amount of incident light using the light amount adjustment apparatus; determination device which determines the most suitable reading conditions for each pixel or for each small area comprising a plurality of pixels from among the reading conditions for each image reading, based on image data obtained from each of the plurality of image readings by the reading apparatus; and a control apparatus which selects for each pixel or each small area data corresponding to the most suitable reading conditions determined by the determination device from the image data obtained from each of the plurality of image readings by the reading apparatus and synthesizes this as output image data.

The reading apparatus according to the tenth aspect reads the image a plurality of times by photoelectrically converting incident light incident from the image being read in units of each single pixel when the image has been divided into a plurality of pixels and also causes the reading conditions to be varied for each reading by adjusting the amount of incident light using the light amount adjustment apparatus. Note that it is possible to use an existing diaphragm, light reduction filter, or the like as the light adjustment apparatus of the tenth aspect as well.

The determination device determines the most suitable reading conditions for each pixel or for each small area comprising a plurality of pixels from among the reading conditions for each image reading by the reading apparatus, while the control apparatus selects for each pixel or each small area data corresponding to the above determined most suitable reading conditions from the image data obtained from each of the plurality of image readings and synthesizes this as output image data. As a result, because output image data equivalent to when the image being read is read under the suitable reading conditions for each pixel or small area unit is synthesized from the results of the plurality of image readings by the reading apparatus, it is possible to read the image at a wide dynamic range and to construct the image reading apparatus cheaply.

Note that when the reading conditions are varied by adjusting the amount of incident light, if, for example, the reading apparatus includes a charge accumulation type reading sensor, saturation of the accumulated charge amount occurs in at least a portion of the cells during the plurality of image readings. However, if a charge accumulation type sensor having anti-blooming characteristics (for example, a sensor having an overflow drain structure) is used, the overflow charge from the cell in which the accumulated charge saturation occurred can be prevented from having adverse effects, which is naturally preferable. Moreover, when the above reading sensor is used in the tenth aspect, the determination of the most suitable reading conditions can be made on the basis of whether or not saturation of the accumulated charge occurred in each cell.

In the image processing method according to the eleventh aspect of the present invention, suitable reading conditions for the image to be read are determined for each pixel or for each small area comprising a plurality of pixels. Then, based on the above determination results, control is performed such that output image data equivalent to that obtained when the image is read under the suitable reading conditions for each pixel unit or each small area unit is obtained from the results of reading the image by photoelectrically converting incident light from the image in units of single pixels when the image to be read has been divided into a plurality of pixels. Therefore, in the same way as in the first aspect, an image can be read at a wide dynamic range without any major increase in the costs being incurred.

BRIEF DESCRIPTION OF THE DRAWINGS

FIG. 1 is a side view showing the schematic structure of the optical system of a film scanner according to the first embodiment.

FIG. 8 is a side view showing the schematic structure of the optical system of a film scanner according to the third embodiment.

FIG. 9 is a flow chart showing the contents of image reading control processing according to the fourth embodiment.

FIG. 12 is a side view showing the schematic structure of the optical system of a film scanner according to another embodiment.

FIG. 13 is a side view showing the schematic structure of the optical system of a film scanner according to still another embodiment.

DESCRIPTION OF THE PREFERRED EMBODIMENTS

Figure 2:
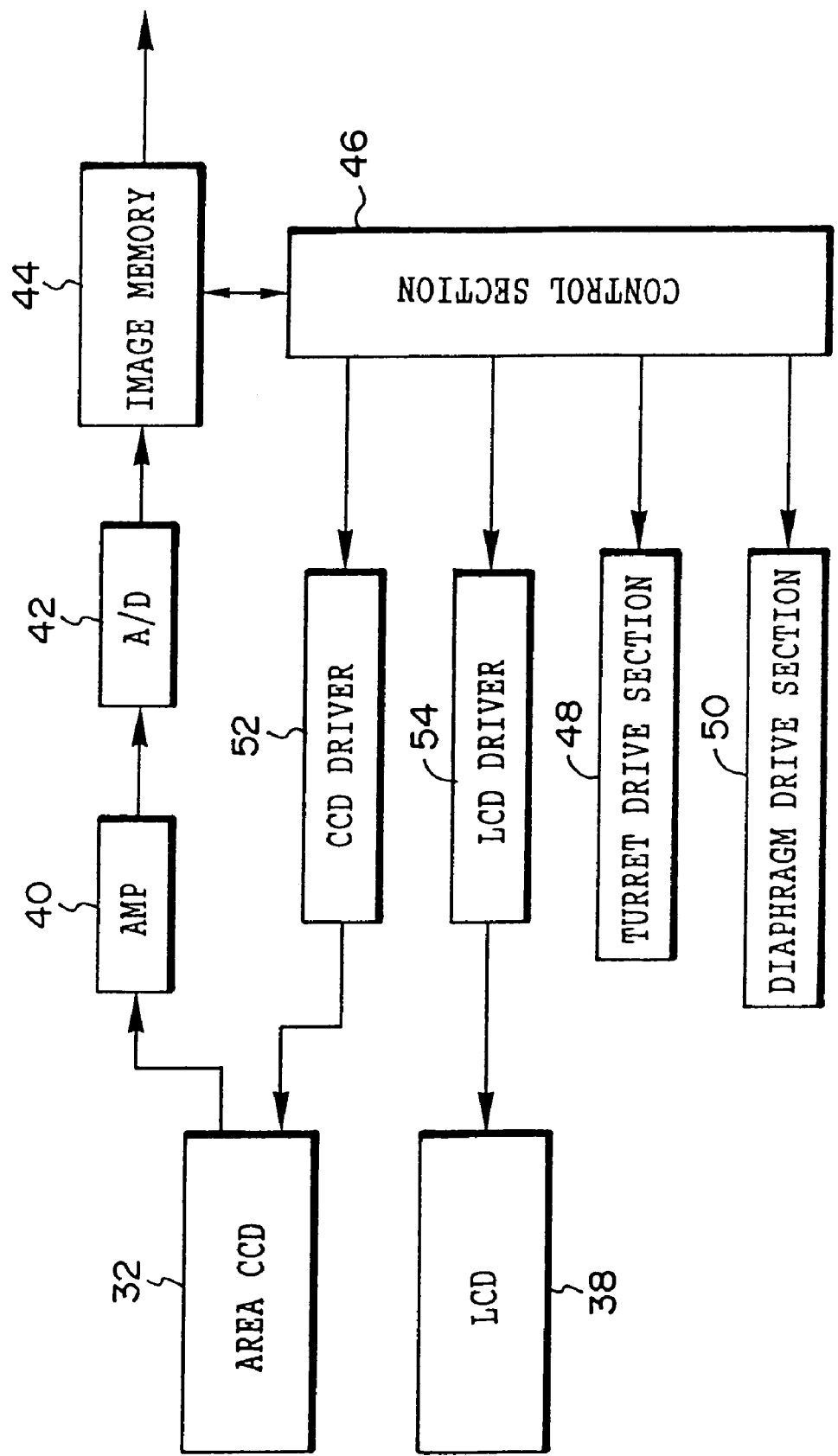
FIG. 2 is a block diagram showing the schematic structure of a signal processing system and control system of a film scanner.

FIG. 1 shows the schematic structure of the optical system of a film scanner 10 according to the first embodiment of the present invention. The optical system of the film scanner 10 is provided with a light source section 12 and a reading section 14 positioned on the opposite side of a photographic film 16 to the light source section 12.

The light source section 12 is provided with a lamp 20 comprising a halogen lamp or the like. A reflector 22 is provided around the lamp 20. A portion of the light emitted from the lamp 20 is reflected by the reflector 22 so as to irradiate in a fixed direction. On the light emission side of the reflector 22 there are positioned along the optical axis L of the light emitted from the reflector 22 in the following sequence: an unillustrated UV/IR cutout filter for cutting out light in the ultraviolet and infrared wavelengths; a light source diaphragm 24 (this corresponds to the light amount adjustment apparatus described in the ninth aspect) for adjusting the amount of light irradiated onto the photographic film 16; a turret 26; and a light diffusion box 30 for changing the light irradiated onto the photographic film 16 into diffused light. Note that the light source diaphragm 24 is driven by a diaphragm drive section 50 (see FIG. 2).

Color separation filters 28 for three component colors (R, G, B) are inserted into the turret 26. These color separation filters 28 are selectively positioned on the optical axis L by the rotation of the turret 26. The turret 26 is rotated so that the color separation filters 28 for each component color are positioned in sequence on the optical axis L. The reading section 14 (described in detail below) performs a reading of the film image each time one of the color separation filters 28 is positioned on the optical axis L. This enables film images recorded on the photographic film 16 to be separated into each of the component colors and read. Note that the turret 26 is driven by a turret drive section 48 (see FIG. 2).

An unillustrated film carrier is provided above the light diffusion box 30 to pull out and transport the photographic film 16 from a cartridge 18 housing the photographic film 16. A plurality of film images are recorded on the photographic film 16 in the longitudinal direction thereof. The photographic film 16 pulled out from the cartridge 18 is intermittently transported so that the center of the screen of each film image recorded thereon is sequentially positioned to match the optical axis L.

The reading section 14 is provided with a monochromatic area CCD 32 (this corresponds to the reading sensor described in the third aspect). Between the photographic film 16 and the area CCD 32 there are provided along the optical axis L in the following sequence: a lens 34 for focusing light transmitted through a film image onto the light receiving surface of the area CCD 32; a lens diaphragm 36 (this corresponds to the light amount adjustment apparatus described in the ninth aspect) for adjusting the amount of light incident on the area CCD 32; and an LCD 38 comprising a plurality of LCD cells arranged in a matrix formation (this corresponds to the incident light amount alteration apparatus described in the third aspect). Light transmitted through the photographic film 16 (through a film image) passes through the lens 34, the position where the diaphragm 36 is disposed, the LCD 38, and strikes the area CCD 32. Note that the lens diaphragm 36 is also driven by the diaphragm drive section 50 (see FIG. 2).

Specifically, the area CCD 32 comprises sensing sections formed from a plurality of photoelectric conversion cells containing CCD cells, photodiodes, or the like for photoelectrically converting incident light and storing it as a charge arranged in a row in a predetermined direction. A plurality of the sensing sections are arranged in a direction orthogonal to the above predetermined direction. The area CCD 32 further comprises an electronic shutter mechanism for uniformly controlling the charge accumulation times of all the photoelectric conversion cells. Transfer sections comprising a plurality of CCD cells are provided near each sensing section and corresponding to each sensing section. Charges accumulated in each CCD cell of each sensing section (the charge amount represents an integral value of the amount of incident light within the charge accumulation period) are transferred in sequence to the outside via the corresponding transfer section.

As is shown in FIG. 2, an amplifier 40, an A/D converter 42, and image memory 44 are connected in that sequence to a signal output terminal of the area CCD 32. Signals output from the area CCD 32 are amplified by the amplifier 40 and converted into digital data by the A/D converter 42. They are then stored in the image memory 44. The image memory 44 is connected to a control section 46 formed from a microcomputer or the like.

A turret drive section 48 is connected to the control section 46. The control section 46 sets a target rotation position of the turret 26 in the turret drive section 48. The turret drive section 48 rotates the turret 26 to the instructed target rotation position. A diaphragm drive section 50 is also connected to the control section 46. The control section 46 sets a target movement position for each of the light source diaphragm 24 and lens diaphragm 36 in the diaphragm drive section 50. The diaphragm drive section 50 then drives the light source diaphragm 24 and lens diaphragm 36 so that they are moved to the set target movement positions.

The control section 46 is connected to the area CCD 32 via a CCD driver 52. The control section 52 sets charge accumulation times for the area CCD 32 when reading a film image in the CCD driver 52. The CCD driver 52 controls the area CCD 32 so that the area CCD 32 reads a film image at the set charge accumulation time. The control section 46 is further connected to the LCD 38 via an LCD driver 54. The control section 46 inputs control data for controlling the light transmission ratio of each LCD cell of the LCD 38 during the film image reading into the LCD driver 54. The LCD driver 54 controls the operation of the LCD 38 such that the values of the light transmission ratios of each cell of the LCD 38 correspond to the input control data.

Figure 3:
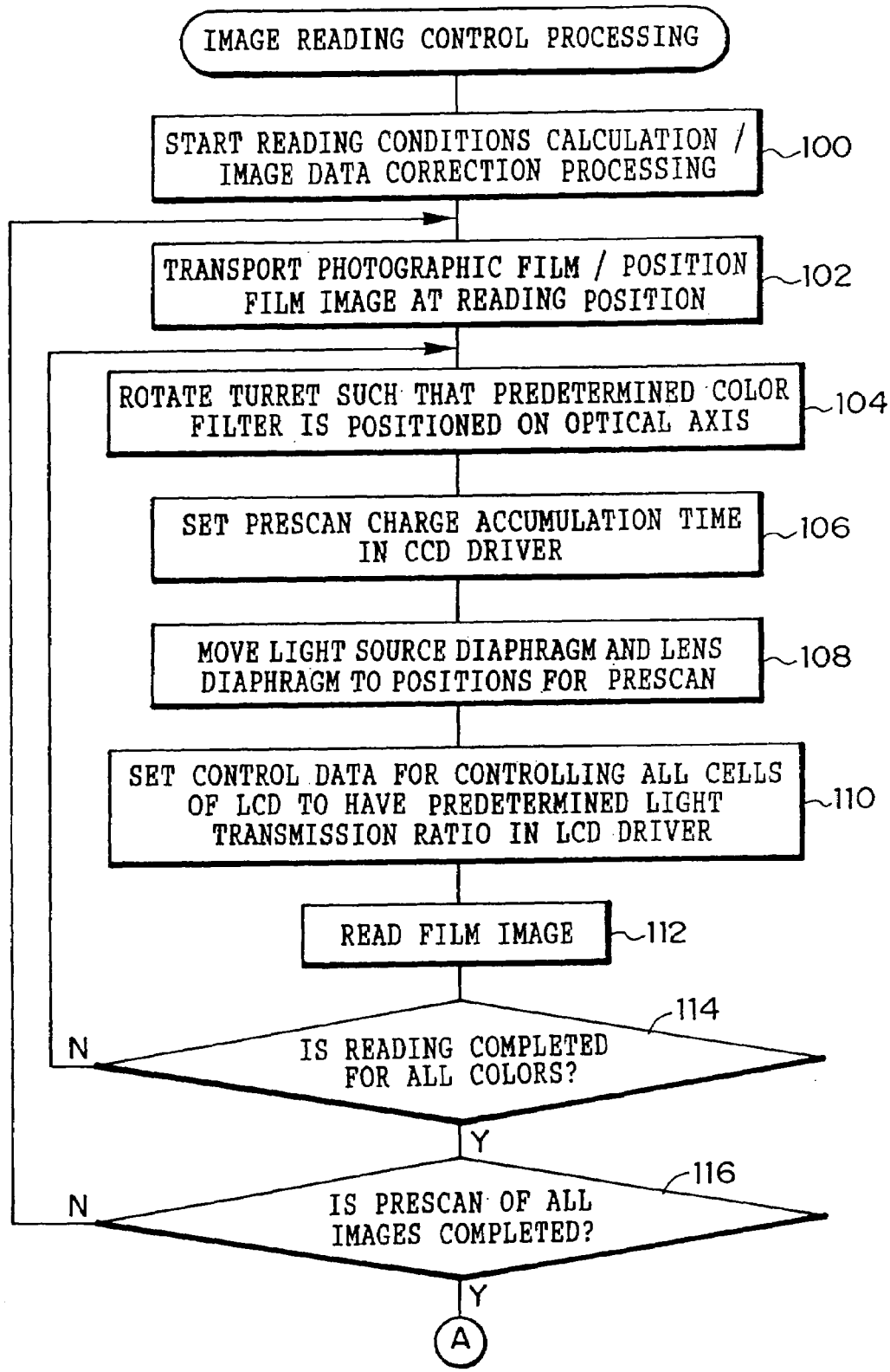
FIG. 3 is a flow chart showing the contents of image reading control processing according to the first embodiment.
Figure 4:
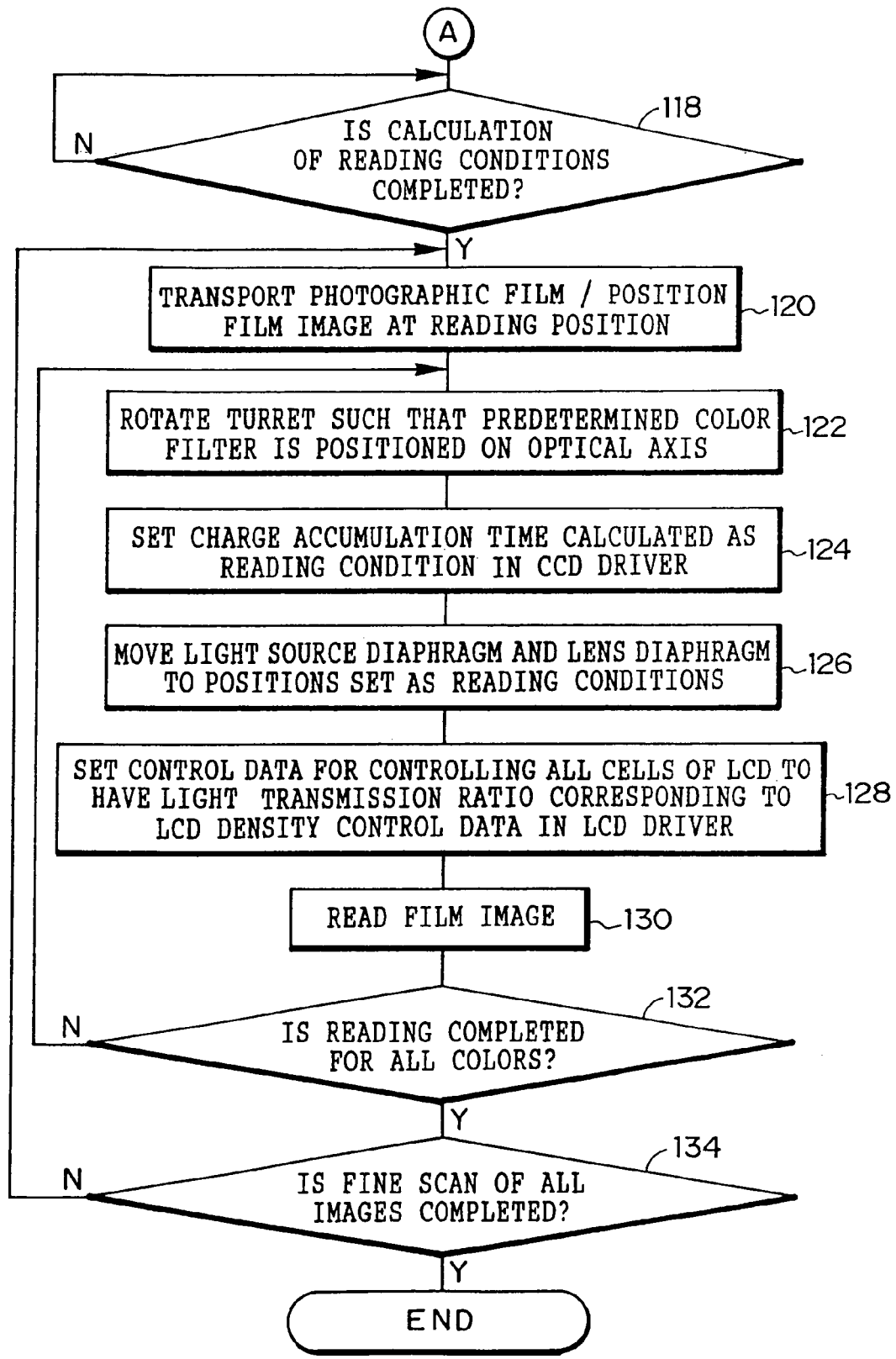
FIG. 4 is a flow chart showing the contents of image reading control processing according to the first embodiment.

The image reading control processing executed by the control section 46 when performing an image reading will firstly be described as an operation of the first embodiment with reference made to the flow chart shown in FIG. 3 and FIG. 4.

In step 100 the image conditions calculation/image data correction processing is started. This processing is executed by the control section 46 in parallel with the image reading control processing and is described below. In the next step 102, a photographic film 16 is transported in the direction in which it is pulled out of the cartridge 18 by the film carrier and is controlled such that the film image recorded at the front of the photographic film 16 is positioned at the reading position (the position where the center of the film image screen matches the optical axis L).

Note that the film scanner 10 according to the first embodiment performs two readings each at a different resolution of each film image recorded on the photographic film 16. In the first reading which is at a comparatively low resolution (a prescan), the positions of the light source diaphragm 24 and the lens diaphragm 36, the charge accumulation time for each component color of the area CCD 32, and the light transmission ratio of each LCD cell of the LCD 38 during the prescan (hereafter, these are referred to simply as "reading conditions") are set such that saturation does not occur in the accumulated charge in each cell of the area CCD 32 even when the density of the film image is extremely low (as, for example, in an underexposed negative image on a negative film). By performing an image reading at a low resolution it is possible to increase the speed of the calculation processing using the image data obtained from the reading.

Note also that the second reading of the film image after the prescan is performed at a comparatively high reading resolution (hereafter referred to as a "fine scan"). However, in an aspect which uses an area sensor (the area CCD 32) as the reading sensor, such as the present embodiment, it is possible to switch reading resolutions (i.e. to obtain image data at a different resolution for each reading) in either of the following ways. Namely, by, for example, performing the prescan reading at the same high resolution as the fine scan reading and performing a post-processing on the obtained image data such as thinning or integrating the pixels. Alternatively, by performing a plurality of readings with the area sensor during the fine scan and moving the area sensor a distance corresponding to one integral portion of the pixel interval for each reading using an actuator such as a piezoelectric element.

In the next step 104 and thereafter, a prescan is performed on the film image positioned at the reading position. Namely, in step 104, the turret 26 is rotated via the turret drive section 48 such that color separation filters 28 for predetermined component colors are positioned on the optical axis L. In step 106, the reading conditions for the prescan are fetched and, from among the fetched reading conditions, the charge accumulation times of the area CCD 32 for each predetermined component color are set for the CCD driver 52.

In step 108, from among the fetched reading conditions, the target movement positions for the light source diaphragm 24 and the lens diaphragm 36 are set in the diaphragm drive section 50. In the next step 110, the control data for controlling the light transmission ratios of each LCD cell of the LCD 38 so that they match the light transmission ratios of each LCD cell of the LCD 38 set in the above fetched reading conditions is input to the LCD driver 54. Note that, in the reading conditions for the prescan, a constant value (for example, the maximum light transmission ratio) is set as the light transmission ratio of each LCD cell of the LCD 38. In the next step 112, the film image positioned at the reading position is read by the area CCD 32. Accordingly, the positioned film image is read in accordance with reading conditions preset for the film scan for a predetermined component color. The result of the reading then passes through the amplifier 40 and the A/D converter 42 and is stored in the image memory 44 as low resolution image data for a predetermined component color.

In step 114, a determination is made as to whether or not readings (prescans) of the film image positioned at the reading position have been completed for all the component colors. If the determination is negative, the routine returns to step 104 and steps 104 to 114 are repeated until the determination in step 114 is affirmative. Consequently, a prescan for reading each component color of the film image positioned at the reading position is performed in sequence. The low resolution image data for the film image is stored in the image memory 44.

When the determination in step 114 is affirmative, the routine proceeds to step 116 where a determination is made as to whether or not prescanning has been completed for all the film images recorded on the photographic film 16. If the determination is negative, the routine returns to step 102 and the next film image is positioned at the reading position. The above prescanning (steps 104 to 116) is then repeated. When prescanning of all film images has been completed, the determination in step 116 is affirmative and the routine proceeds to step 118 where the routine waits until the calculation of the reading conditions in the reading conditions calculation/image data correction processing started in the earlier step 100 is completed.

Figure 5:
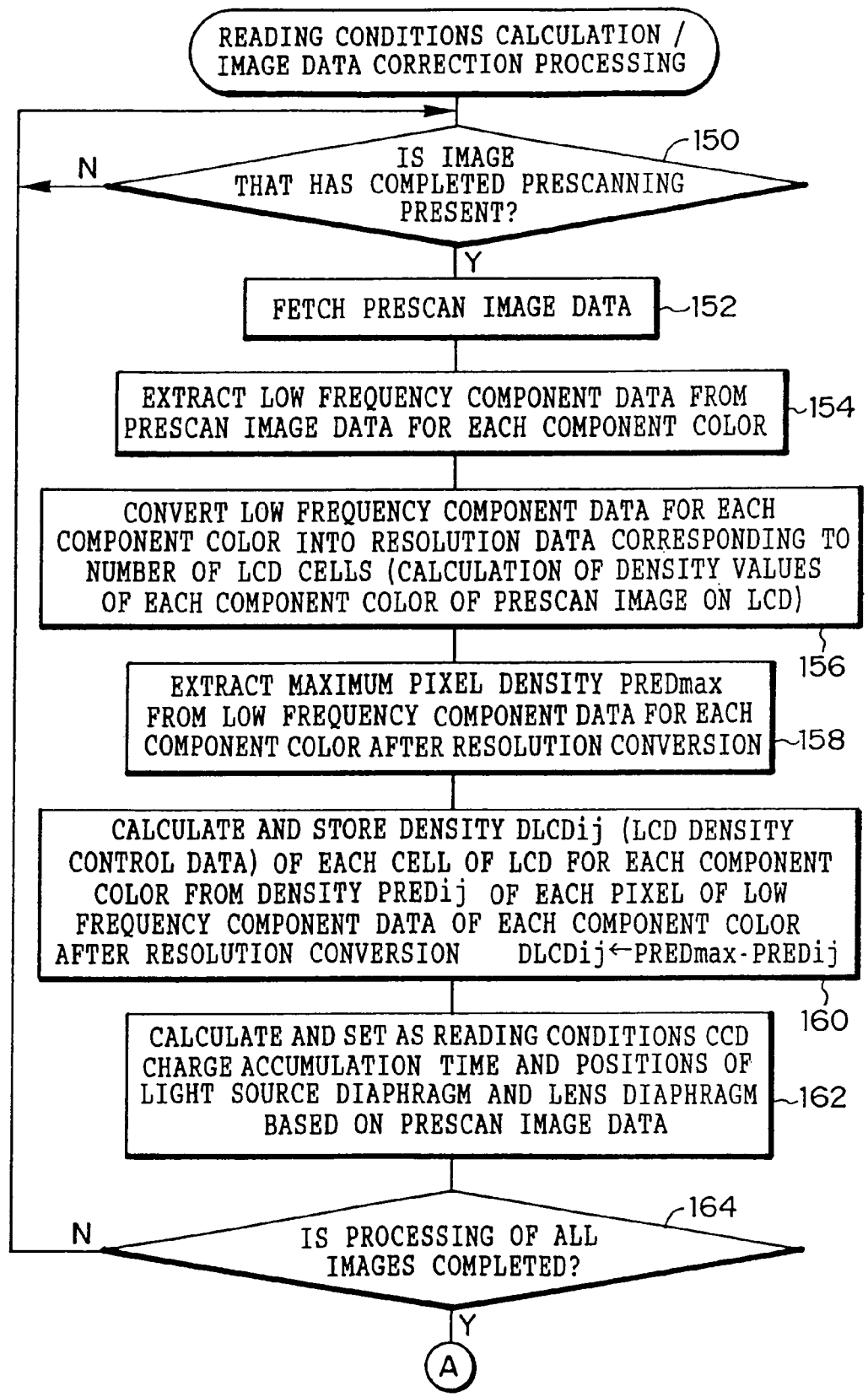
FIG. 5 is a flow chart showing the contents of reading conditions calculation/image data correction processing.
Figure 6:
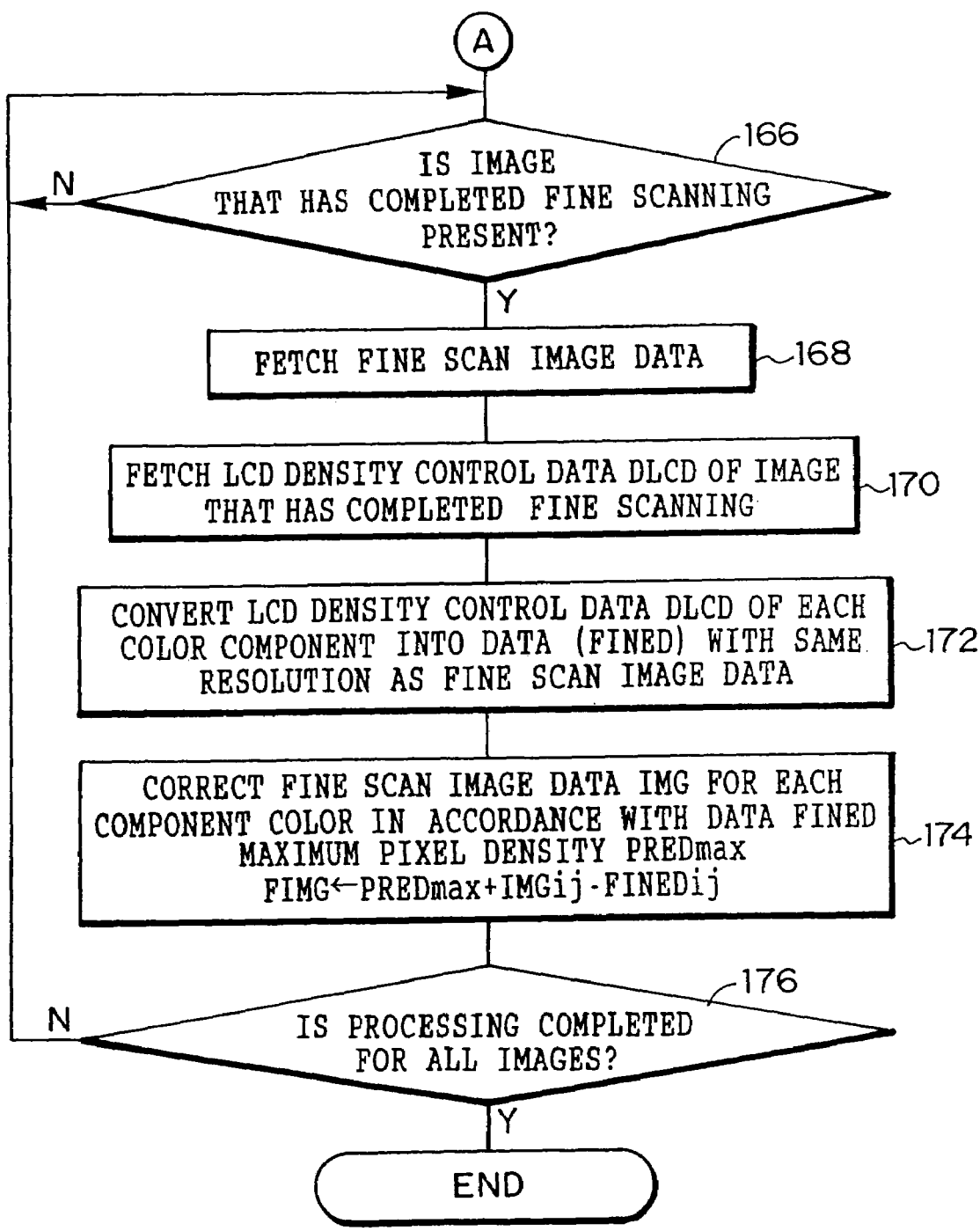
FIG. 6 is a flow chart showing the contents of reading conditions calculation/image data correction processing.

As is shown in FIG. 5 and FIG. 6, in the reading conditions calculation/image data correction processing, a determination is made in step 150 as to whether or not a film image which has completed prescan processing is present. If the determination is negative the routine waits until the determination is affirmative. When prescanning of a particular film image has been completed, the determination in step 150 is affirmative and the routine proceeds to step 152 where low resolution data of the film image stored in the image memory 44 after completing the prescan is fetched and is converted to data representing density values of the film image (prescan image data) based on the prescan reading conditions.

In the next step 154 and thereafter, the film image corresponding to the fetched prescan image data is read once again (a fine scan) based on the fetched prescan image data. During this fine scan, suitable reading conditions are determined such that the accumulated charge amount is as great as possible without saturation of the accumulated charge occurring in each of the photoelectric conversion cells of the area CCD 32.

In the first embodiment, the reading conditions for reading the film image (the amount of incident light on the area CCD 32) can be adjusted by altering the light transmission ration of the LCD cells of the LCD 38. However, because the number of LCD cells of the LCD 38 is less than the number of photoelectric conversion cells of the area CCD 32, when the light transmission ratio of only one LCD cell of the LCD 38 is altered, the amount of incident light on each of the plurality of photoelectric conversion cells of the area CCD 32 changes. Accordingly, in the present embodiment, by independently altering the light transmission ratio of the LCD 38 for each single LCD cell unit, the reading conditions for the film image being read is made alterable in units of small areas (comprising a plurality of pixels) which correspond to a plurality of photoelectric conversion cells of the area CCD 32.

Moreover, the alteration of the light transmission ratio of the LCD 38 during the reading of the film image by the area CCD 32 corresponds to an adjustment of the density of the film image as seen from the area CCD 32. However, in contrast to when the film image being read is focused on the light receiving surface of the area CCD 32 by the lens 34, because the LCD 38 is positioned at a predetermined distance from the area CCD 32, the film image being read is optically blurred at the position of the LCD 38.

Therefore, when determining the light transmission ratio (one of the reading conditions) of each LCD cell of the LCD 38 during the film image reading, firstly, in step 154, a filtering processing or the like is performed for the data of each component color on the prescan image data fetched in the previous step 152. This allows low frequency components to be extracted from the prescan image data of each component color.

Next, in step 156, the data representing the low frequency components extracted for each component color (low frequency component data) in step 154 is converted into resolution data corresponding to the number of LCD cells in the LCD 38. As a result, data representing the density values of each component color of the film image at the positions of each LCD cell of the LCD 38 when reading a film image corresponding to the prescan image data can be obtained (image density data at the LCD).

In step 158, the maximum pixel densities $PRED_{max}$ for each component color are extracted based on the image density data at the LCD. In the next step 160, the densities DLCDij (i.e. the LCD density control data, wherein i and j are symbols identifying each LCD cell) of each LCD cell of the LCD 38 for making the amount of incident light on the area CCD 32 as large as possible without saturation arising in the accumulated charge in each photoelectric conversion cell during the fine scan of the film image are calculated.

Note that the LCD density control data expresses reading conditions for the LCD 38 when reading a film image and can be obtained by calculating the density DLCDij using the formula given below for each LCD cell and each component color based on, for example, the maximum pixel density $PRED_{max}$ extracted for each component color and the density values PREDij of each component color of each pixel (LCD cell) which are represented by the image density data at the LCD.

$$DLCDij \leftarrow PRED_{max} - PREDij$$

In the above formula, the higher the density value PREDij at the LCD cell (the density of the small area on the film image corresponding to that LCD cell), the lower the density DLCDij of the LCD cell (when the density value PREDij is equal to the maximum pixel density $PRED_{max}$, then the density value DLCDij is 0). Because the density value PREDij represents the low frequency components in a film image, by performing control such that the density of each LCD cell of the LCD 38 matches the density value DLCDij when a fine scan of a film image is performed, the low frequency components in the film image can be cancelled out by the LCD 38. As a result, the amount of incident light on each photoelectric conversion cell of the area CCD 32 can be prevented from being too great or too little, regardless of the density of each portion of a film image, and a film image can be read by the area CCD 32 with a high degree of accuracy.

In the next step 162, reading conditions other than the LCD density control data, namely, the area CCD 32 charge accumulation time and the target movement positions of the light source diaphragm 24 and the lens diaphragm 36 are calculated for each component color based on the prescan image data. With this step, the calculation of the reading conditions (i.e. the LCD density control data, the charge accumulation time of the area CCD 32, and the target movement positions of the light source diaphragm 24 and the lens diaphragm 36) for performing a fine scanning of a film image corresponding to the prescan image data fetched in step 152 is completed.

In the next step 164, a determination is made as to whether or not the calculation of the reading conditions for the fine scanning of all the film images recorded on the photographic film 16 has been completed. If the determination is negative, the routine returns to step 150. Consequently, each time the prescanning of a particular film image is completed, the reading conditions for performing the fine scan on that film image are calculated until the calculation of the reading conditions for the fine scanning of all the film images is completed. When the calculation of the reading conditions for the fine scanning of all the film images has been completed, a determination is made, in step 166, as to whether or not a film image that has completed the fine scanning process is present. The routine waits at this point until the determination is affirmative.

Meanwhile, in the reading control processing (FIG. 3 and FIG. 4), when the determination in step 166 of the reading conditions calculation/image data correction processing is affirmative, the determination in step 118 described above is also affirmative and the routine proceeds to step 120. Control processing is then performed such that the photographic film 16 is transported by the film carrier in the direction in which it is rewound on the cartridge 18 and the film image recorded at the tail of the photographic film 16 is positioned at the reading position.

In the next step 122 and thereafter, fine scanning is performed on the film image positioned at the reading position. Namely, in step 122, the turret 26 is rotated by the turret drive section 48 so that the color component filter 28 of a predetermined color component is positioned on the optical axis L. In the next step 124, the reading conditions for the fine scan calculated in the reading conditions calculation/image data correction processing are fetched and the charge accumulation time of the area CCD 32 for the predetermined color component is set from among the fetched reading conditions in the CCD driver 52.

In step 126, the target movement positions of the lens source diaphragm 24 and the lens diaphragm 36 are set from among the fetched fine scan reading conditions in the diaphragm drive section 50. In the next step 128, based on the LCD density control data for the predetermined component color from among the fetched fine scan reading conditions, control data is input into the LCD driver 54 for performing control such that the light transmission ratios of each LCD cell of the LCD 38 correspond to the density DLCDij of each LCD cell which is represented by the LCD density control data.

As a result, the densities of each LCD cell of the LCD 38 are controlled so as to match the density values DLCDij of each LCD cell determined by the LCD density control data. A density pattern which accords with the LCD density control data is shown on the LCD 38.

In step 130, the film image positioned at the reading position is read by the area CCD 32. Consequently, the positioned film image is read in accordance with the fine scan reading conditions calculated in the above reading conditions calculation/image data correction processing for a predetermined component color. The results of the reading pass through the amplifier 40 and the A/D converter 42 and are stored in the image memory 44 as high resolution image data for the predetermined component color.

As was stated above, when performing a fine scan of a film image, because the reading is performed in a state where the densities of each LCD cell of the LCD 38 are controlled so as to match the density values DLCDij based on LCD density control data obtained from the prescan image data, a highly accurate reading of the film image can be performed by each photoelectric conversion cell of the area CCD 32.

In step 132, a determination is made as to whether or not reading (fine scanning) of the film image positioned at the reading position has been completed for all the component colors. If the determination is negative, the routine returns to step 122 and steps 122 to 132 are repeated until the determination in step 132 is affirmative. Accordingly, fine scanning of the film image positioned at the reading position is performed for each of the component colors in sequence and high resolution image data of the film image is stored in the image memory 44.

When the determination in step 132 is affirmative, the routine proceeds to step 134 where a determination is made as to whether or not all the film images recorded on the photographic film 16 have been fine scanned. If this determination is negative, the routine returns to step 120 and the next film image is positioned at the reading position. The above described fine scanning (i.e. steps 122 to 134) is then repeated. When all the film images have been fine scanned, the determination in step 134 is affirmative and the image reading control processing is completed.

When the fine scanning of a single film image has been completed, the determination in step 166 of the reading conditions calculation/image data correction processing (FIG. 5 and FIG. 6) is affirmative and the routine proceeds to step 168.

In step 168, the high resolution image data of the film image which was stored in the image memory 44 when the scanning was completed is fetched. The fetched image data is then corrected in accordance with the fine scan reading conditions (specifically, the charge accumulation time of the area CCD 32 and the positions of the light source diaphragm 24 and the lens diaphragm 36). Note that, in the description below, image data that has undergone the correction of step 168 is referred to as fine scan image data IMGmn (wherein m and n are symbols for identifying each pixel of the image data).

The fine scan image data IMG represents an image which is the image being read after low frequency components have been removed therefrom, namely, an image corresponding to the mid and high frequency components of the film image being read. Therefore, in the next step 170 and thereafter, by adding an image corresponding to the low frequency components of the film image being read to the fine scan image data IMG, image data which represents the film image being read is obtained.

Namely, in step 170, the LCD density control data DLCD, which is one of the reading conditions for the fine scan of the film image corresponding to the previously fetched image data, is fetched. In the next step 172, the data for each color component of the fetched LCD density control data is converted into data FINED having a resolution equivalent to the fine scan image data IMG.

Next, in step 174, the fine scan image data IMG is corrected in accordance with the data FINED after the resolution conversion thereof and the maximum pixel density $PRED_{max}$ extracted in the earlier step 158 thus giving image data FIMG representing the film image being read. Note that the image data FIMG can be obtained by calculating the pixels density for each component color in accordance with the formula (1) given below.

$$FIMG_{mn} \leftarrow PRED_{max} + IMG_{mn} - FINED_{mn} \qquad (1)$$

In formula (1), $(PRED_{max} - FINED_{mn})$ represents the low frequency components of the film image being read. By adding $(PRED_{max} - FINED_{mn})$ to the fine scan image data IMG, image data FIMG (high accuracy and high resolution image data in which the prescan image data and the image mean density and histogram shape match) equivalent to that when the film image is read with a high degree of accuracy at a high dynamic range for each photoelectric conversion cell of the area CCD 32 can be obtained.

Note that, in the above, because the values obtained by subtracting the density value PREDij from the maximum pixel density $PRED_{max}$ are set as the LCD density control data DLCDij, the maximum pixel density $PRED_{max}$ is added in formula (1) in order to make the image mean density represented by the fine scan image data IMG match the image mean density represented by the prescan image data. However, when, for example, a separate processing is performed to match the prescan image data with the image mean density (or the histogram shape) after obtaining the fine scan image data IMG, then it is also possible to obtain the fine scan image data IMG using a formula in which no addition of the maximum pixel density $PRED_{max}$ is performed.

When the correction, as described above, of the image data of a single film image has been completed, a determination is made, in the next step 176, as to whether or not the correction processing has been performed on all the film images. If this determination is negative, the routine returns to step 166 and correction (i.e. steps 168 to 174) of the image data obtained from the fine scan is performed each time the fine scanning of a single film image is completed.

When correction of the image data of all the film images has been completed, the determination in step 176 is affirmative and the reading conditions calculation/image data correction processing is ended. Accordingly, it is possible to obtain image data FIMG equivalent to that obtained when the film image is read at a high dynamic range with a high degree of accuracy for all the film images recorded on the photographic film 16. Moreover, because there is no need to use high cost parts such as a low noise reading sensor or a multi bit A/D converter to obtain image data equivalent to the image data FIMG, the film scanner 10 can be constructed cheaply.

Steps 120, 130, 132, and 134 of the above image reading control processing (FIG. 3 and FIG. 4) correspond to the area CCD 32, the LCD 38, the light source diaphragm 24 and lens diaphragm 36 and to the reading apparatus of the present invention (specifically, to the reading apparatus described in the second aspect thereof (more specifically, to the reading apparatus described in the third and ninth aspects thereof)). Further, steps 152 to 162 of the reading conditions calculation/image data correction processing (FIG. 5 and FIG. 6) correspond to the determination device of the present invention. Steps 122 to 128 of the image reading control processing and steps 170 to 174 of the reading conditions calculation/image data correction processing correspond to the control apparatus of the present invention (specifically, to the reading apparatus described in the second aspect thereof (more specifically, to the reading apparatus described in the third and ninth aspects thereof)).

(Second Embodiment)

Figure 7:
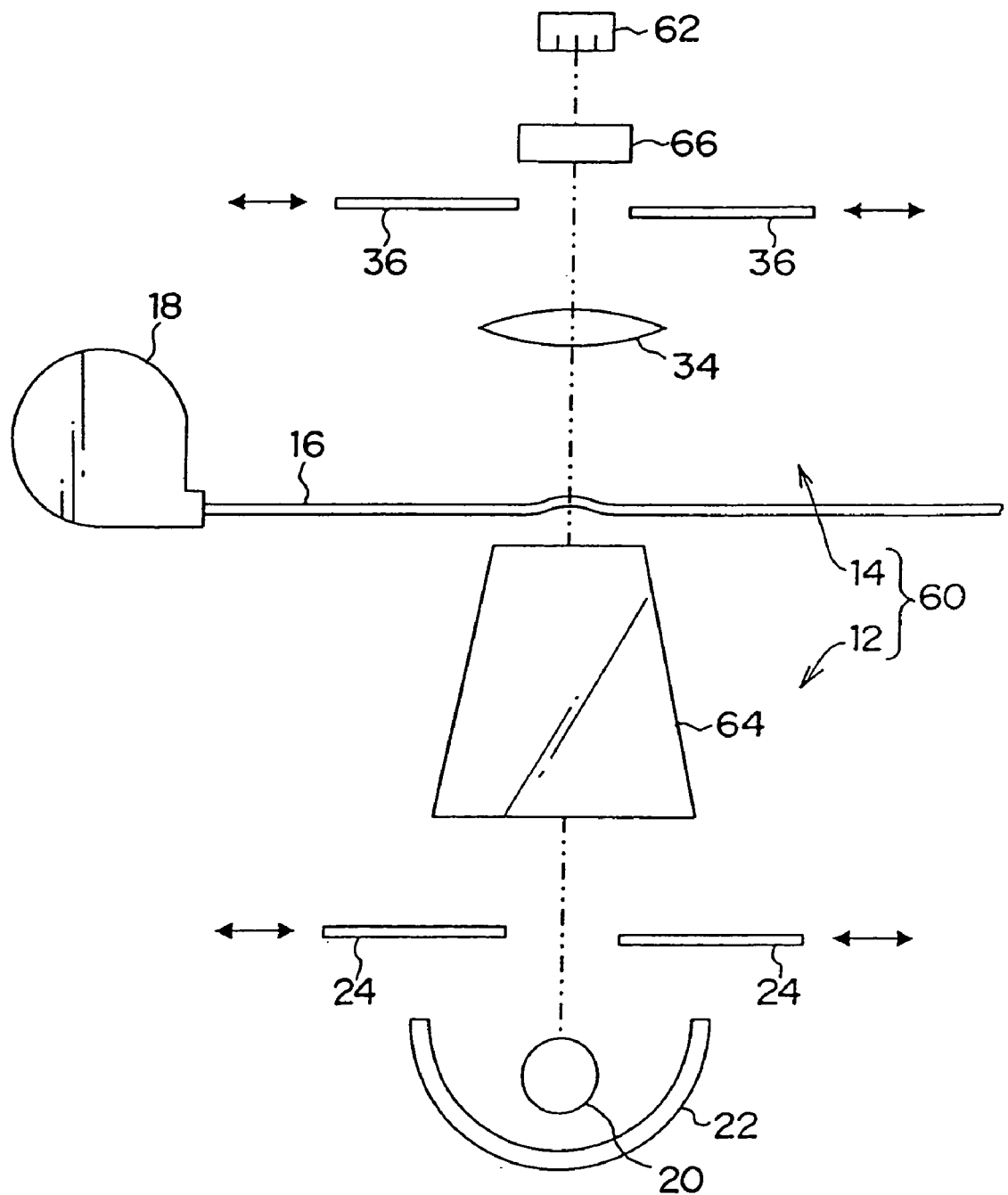
FIG. 7 is a side view showing the schematic structure of the optical system of a film scanner according to the second embodiment.

The second embodiment of the present invention will now be described. Note that, in the description given below, parts that are the same as in the first embodiment are given the same descriptors and an explanation thereof is omitted. A film scanner 60 according to the second embodiment is shown in FIG. 7. In the film scanner 60, a linear CCD 62 (this also corresponds to the reading sensor described in the third aspect) is provided in place of the area CCD 32.

The linear CCD 632 comprises three lines of sensing sections arranged parallel to each other with an interval therebetween. The sensing sections are formed from a plurality of photoelectric conversion cells containing CCD cells, photodiodes, or the like for photoelectrically converting incident light and storing it as a charge arranged in a row in a predetermined direction. Each sensing section is provided with an electronic shutter mechanism for uniformly controlling the charge accumulation times in each photoelectric conversion cell belonging to the same sensing section. On the incident light side of each sensing section is attached one of either an R, G, or B color separation filter (thus forming what is known as a 3-line color CCD). Transfer sections comprising a plurality of CCD cells are provided near each sensing section and corresponding to each sensing section. Charges accumulated in each CCD cell of each sensing section are transferred in sequence to the outside via the corresponding transfer section.

Because the linear CCD 62 in the film scanner 60 according to the second embodiment is a linear color CCD, the turret 26 and color separation filters 28 are not provided. Note that in place of the color separation filters 28, it is possible to provide balance filters for altering the balance of the amount of light of each component color in accordance with the color balance of the film base of the photographic film 16.

The film scanner 60 is provided with a light diffusion box 64. Although not illustrated, the light diffusion box 64 is shaped such that width thereof in the direction of transportation of the photographic film 16 becomes gradually narrower the closer to the top side (the light emission side) in the direction of the optical axis relative to the linear CCD 62, and such that the width thereof becomes gradually wider in the direction orthogonal to the direction of transportation (i.e. the transverse direction of the photographic film 16). Light emitted from the lamp 20 passes through the diffusion box 64 and is irradiated onto the photographic film 16 in the form of slit light whose longitudinal direction is the transverse direction of the photographic film 16. At the position where the slit light from the diffusion box is irradiated onto the photographic film 16 (the reading position), the photographic film 16 is curved in an upwards protruding shape by an unillustrated guide. As a result, the planarity of the photographic film 16 at the reading position is ensured.

In place of the LCD 38 which was provided with LCD cells arranged in a matrix formation, the film scanner 60 is provided with an LCD 66 (this also corresponds to the incident light amount adjustment apparatus described in the third aspect). The LCD 66 is provided with a predetermined number of LCD cell rows (the number of rows is such that the width of the LCD 66 in the film transportation direction is slightly wider than the width of the luminous flux of the slit light which has passed through the photographic film 16 at the position where the LCD 66 is located), each of which comprises a plurality of LCD cells arranged in a row, running in the transverse direction of the photographic film 16.

In the film scanner 60 structured in this manner, the reading of a film image (both prescan and fine scan) is performed by the linear CCD 62 reading each color component in parallel in units of one line in the transverse direction of the film, while the photographic film 16 is transported at a constant speed.

Accordingly, in the above film scanner 60, the color image data for the film image obtained from the prescan is converted to monochrome image data using a known conversion format, such as NTSC, and the LCD density control data for the film image is determined in line units based on the monochrome image data. Consequently, during fine scanning of the film image, the density of each LCD cell of the LCD 66 is controlled at a timing synchronous to the reading in line units of the image based on the LCD density control data for the line units.

As a result, the amount of incident light on each photoelectric conversion cell of the linear CCD 62 during the fine scan can be prevented from being either too great or too little. Moreover, by determining from the image data obtained from the fine scan the data FINED having the same resolution as the fine scan image data and performing the calculation given in formula (1), image data FIMG equivalent to that obtained when the film image is read at a high dynamic range and with a high degree of accuracy can be obtained.

Note that, in the above first and second embodiments, the reading conditions (the amount of incident light on the photoelectric conversion cells) are adjusted in units of small areas comprising a plurality of photoelectric conversion cells by the LCD, however, the present invention is not limited to this and, for example, an LCD provided with more LCD cells than the number of photoelectric conversion cells of the reading sensor may be used as the LCD. In addition, it is also possible to create a structure in which the reading conditions are adjusted in units of pixels by, for example, placing the reading sensor and the LCD in close contact.

(Third Embodiment)

The third embodiment of the present invention will now be described. Note that, in the description given below, parts that are the same as in the first embodiment are given the same descriptors and an explanation thereof is omitted.

As is shown in FIG. 8, The LCD 38 is not provided in the film scanner 70 according to the third embodiment (the LCD driver 54 is also not provided and thus not illustrated). In the area CCD 32 of the first embodiment, an electronic shutter mechanism was provided for uniformly controlling the charge accumulation times of all the photoelectric conversion cells, however, in the third embodiment, an area CCD 72 (this corresponds to the charge accumulation type reading sensor described in the sixth aspect) having an electronic shutter mechanism capable of adjusting the charge accumulation times of each single photoelectric conversion cell is provided in place of the area CCD 32.

The area CCD 72 is provided with an electronic shutter mechanism in each photoelectric conversion cell which includes switching elements for switching between a first state, in which a charge obtained by photoelectrically converting incident light in a photoelectric conversion cell is accumulated in a CCD cell, and a second state, in which the charge is discharged to a substrate. The CCD driver 52 has the function of controlling (i.e. by switching the state of the switching elements between the first state and second state) the electronic shutter mechanism of each photoelectric conversion cell by generating and outputting to the area CCD 72 electronic shutter control signals for each of the photoelectric conversion cells.

In the film scanner 70 according to the third embodiment, during the prescan the film image is read for a fixed charge accumulation time, as in the first embodiment, and the charge accumulation times of the area CCD 72 during the fine scan are set for each photoelectric conversion cell (this processing corresponds to the determination device) so that the higher the density of the pixel, the longer the charge accumulation for that pixel (and the lower the density value, the shorter the charge accumulation time) based on the density values of each pixel in the film image which are represented by the prescan image data.

During the fine scan, the charge accumulation times set for each photoelectric conversion cell are input into the LCD driver 54. The LCD driver 54 generates an electronic shutter mechanism control signal for each photoelectric conversion cell such that the only the charge generated in the photoelectric conversion cell within the period that corresponds to the input charge accumulation time is accumulated in each of the photoelectric conversion cells of the area CCD 72 and outputs these electronic shutter mechanism control signals to the area CCD 72 (this processing corresponds to the control apparatus of the sixth aspect). As a result, saturation of the accumulated charge in each photoelectric conversion cell of the area CCD 72 or an insufficient charge therein can be prevented, and each pixel of a film image can be read with a high degree of accuracy.

Note that, in the above third embodiment, the example in the description given was one in which the area CCD 72 was used as a charge accumulation type reading sensor capable of independently altering the charge accumulation time in units of photoelectric conversion cells (pixels), however, the present invention is not limited to this, and, as is the case with a linear CCD, a linear sensor in which one or a plurality of rows of photoelectric conversion cells (sensing sections) are provided and which is capable of independently altering the charge accumulation time in units of photoelectric conversion cells (pixels) may be used.

Moreover, in the above third embodiment, the charge accumulation times in the area CCD 72 are independently controlled in units of photoelectric conversion cells using an area CCD 72 (i.e. a charge accumulation type reading sensor) capable of adjusting the charge accumulation time for each photoelectric conversion cell (pixel). However, the sixth aspect is not limited to this and, for example, a charge accumulation type reading sensor capable of adjusting the charge accumulation time for cell groups comprising a plurality of photoelectric conversion elements (i.e. for small areas comprising a plurality of pixels) may be used and the charge accumulation time of the reading sensor independently controlled in units of small areas.

(Fourth Embodiment)

The fourth embodiment of the present invention will now be described. Although unillustrated, the film scanner according to the fourth embodiment has substantially the same structure as the film scanner 70 according to the third embodiment described above. However, in place of the area CCD 72 which is capable of adjusting the charge accumulation time each individual photoelectric conversion cell, the film scanner according to the fourth embodiment is provided with the area CCD 32 according to the first embodiment (i.e. an area CCD provided with a shutter mechanism for uniformly controlling the charge accumulation times of all the photoelectric conversion cells).

Figure 10:
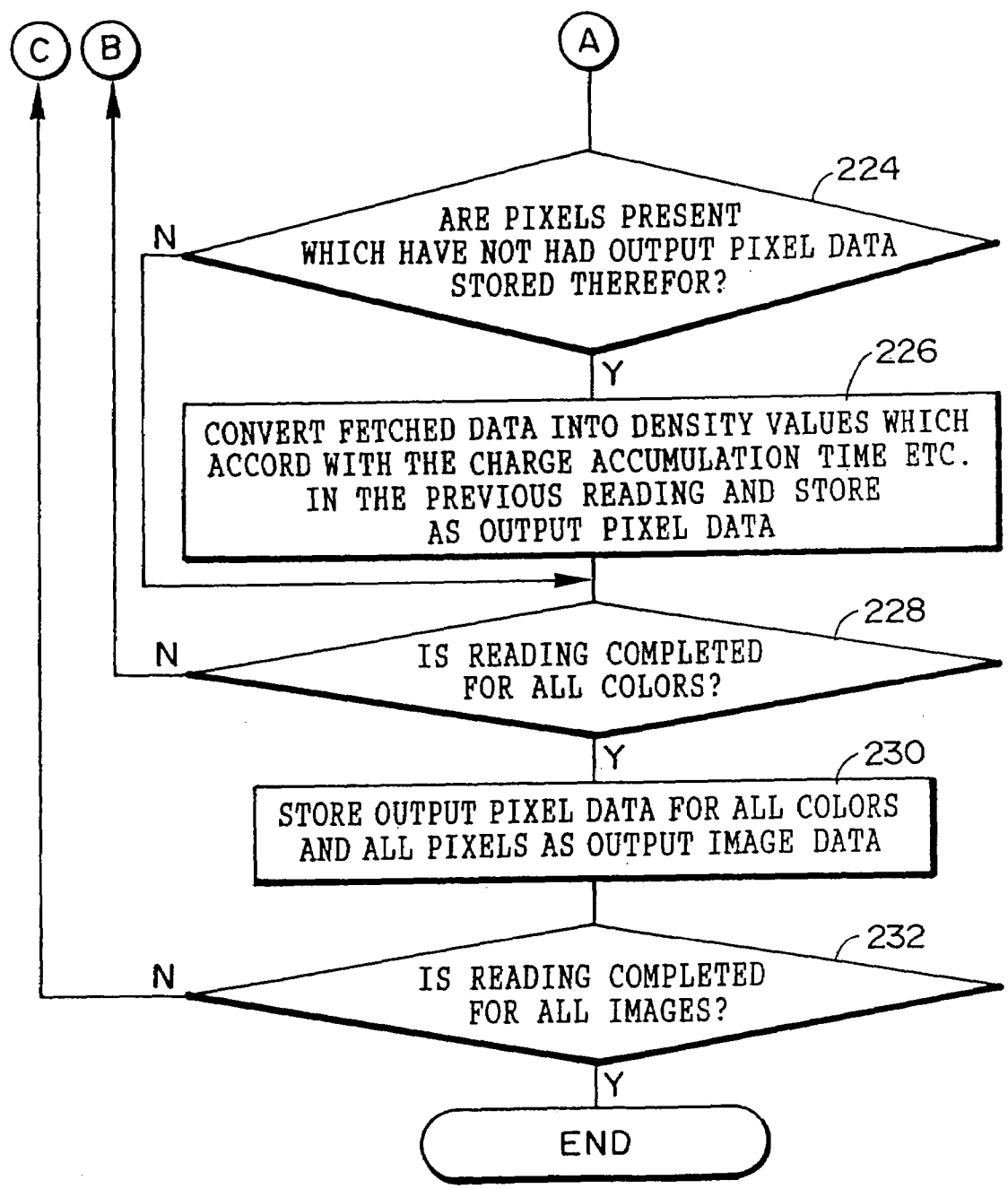
FIG. 10 is a flow chart showing the contents of image reading control processing according to the fourth embodiment.

The image reading control processing according to the fourth embodiment will now be described with references made to the flow chart shown in FIG. 9 and FIG. 10. In step 200, the charge accumulation time for the area CCD 32 for a predetermined component color is set in the CCD driver 52. In step 201, the lens diaphragm 36 (this equates to the light amount adjustment apparatus described in the tenth aspect) is moved to a predetermined position via the diaphragm drive section 50. Next, in step 202, the photographic film 16 is transported by the film carrier so that the front film image is positioned at the reading position. In step 204, the turret 26 is rotated via the turret drive section 48 so that the color separation filter for the predetermined component color is positioned on the optical axis L.

In the next step 206, the light source diaphragm filter 24 is moved to a predetermined position at which the amount of light passing through the light source diaphragm 24 (i.e. illumination light for illuminating the film image) is at the minimum (minimum light amount position). Next, in step 210, the film image positioned at the reading position is read by the area CCD 32. Note that this reading is performed at a high resolution corresponding to a fine scan and the high resolution image data is stored in the image memory 44.

In step 212, the high resolution image data stored in the image memory 44 is fetched. In step 214, the values of each of the pixels represented by the fetched high resolution image data are compared with a predetermined value (i.e. a value at the borderline of whether or not saturation of the accumulated charge in the corresponding photoelectric conversion cell occurs). This comparison enables a determination to be made as to whether or not any pixels (photoelectric conversion cells) are present in which saturation of the accumulated charge occurred in the current reading. Because, in the current reading, the light source diaphragm 24 is moved to the minimum light amount position and the amount of illumination light on the film image is extremely small, there is no saturation on the accumulated charge in the current reading (the first reading) and the determination in step 214 is negative. The routine then moves ahead to step 220.

In step 220, a determination is made as to whether or not a predetermined plurality of readings for a predetermined component color have been performed on the film image positioned at the reading position. If the determination is negative, in step 222, the light source diaphragm 24 is moved by a predetermined amount in the direction in which the amount of illumination light on the film image increases and the routine returns to step 210. Accordingly, steps 210 to 222 are repeated until the determination in step 220 is affirmative. Moreover, the reading of the film image positioned at the reading position is performed the predetermined plurality of times for the predetermined component color while the amount of illumination light on the film image is gradually increased.

Further, as the amount of illumination light on the film image is gradually increased, cells (pixels) appear in which saturation of the accumulated charge in each photoelectric conversion cell of the area CCD 32 has occurred. Accordingly, the determination instep 214 is affirmative and the routine proceeds to step 216. In step 216, pixel data obtained from the previous reading for the cell (pixel) in which saturation of the accumulated charge occurred in the current reading is fetched from the image memory 44.

Next, in step 218, based on reading conditions in the previous reading such as the position of the light source diaphragm 24 and the charge accumulation time, the fetched pixel data is converted to data representing the density values on the film image. The converted data is then stored in the image memory 44 as output pixel data, and the routine proceeds to step 220. Note that cells (pixels) which have been stored in the image memory 44 as output pixel data are not subject to the determination in step 214 (output pixel data stored in the image memory 44 is not updated).

When the film image positioned at the reading position is read the predetermined number of times for the predetermined component color, the determination in step 220 is affirmative and the routine proceeds to step 224. In step 224, a determination is made as to whether or not pixels are present for which no output pixel data has been stored in the image memory 44 (i.e. pixels (cells) for which saturation of the accumulated charge did not occur during the predetermined number of readings). If the determination is negative, the routine proceeds to step 228.

If, however, the determination is affirmative, in the next step 226, the data for those pixels is fetched from the data fetched in the earlier step 212 (data obtained from the current (final) reading) and, based on reading conditions in the current reading such as the position of the lens diaphragm 24 and the charge accumulation time, the fetched pixel data is converted to data which represents density values on the film image. The converted data is then stored as output pixel data in the image memory 44 and the routine proceeds to step 228.

In step 228, a determination is made as to whether or not reading of the film image positioned at the reading position has been completed for all the component colors. If the determination is negative, the routine returns to step 204 and steps 204 to 228 are repeated until the determination in step 228 is affirmative. Accordingly, the above reading is performed on the film image positioned at the reading position for all of the component colors in sequence. When the determination in step 228 is affirmative, the output pixel data for all the component colors and all the pixels stored in the image memory 44 is stored in the image memory 44 as output image data.

As described above, because, in the fourth embodiment, the predetermined number of image readings is performed while gradually increasing the amount of illumination light on the film image, the data obtained from the reading immediately before the saturation of the accumulated charge occurred is used for the output pixel data for the cells of the area CCD 32 in which saturation of the accumulated charge arose. Moreover, data obtained from the reading when the amount of illumination light was at maximum is used as the output pixel data for the cells in which saturation of the accumulated charge did not occur. As a result, it is possible to obtain output image data for each cell equivalent to that obtained when the image is read at a high dynamic range and with a high degree of accuracy.

Steps 202 to 212, 220, 222, 228 and 232 of the above image reading control processing correspond to the area CCD 32, the CCD driver 52, the light source diaphragm 24 and to the reading apparatus of the present invention (specifically, to the reading apparatus described in the tenth aspect thereof. Further, steps 214 and 224 correspond to the determination device of the present invention (specifically to the determination device described in the tenth aspect). Moreover, steps 216, 218, 226, and 230 correspond to the control apparatus of the present invention (specifically, to the control apparatus described in the tenth aspect).

In step 232, a determination is made as to whether or not reading of all the film images recorded on the photographic film 16 has been completed. Steps 202 to 232 are repeated until this determination is affirmative. When the determination in step 232 is affirmative, the image reading control processing is ended.

(Fifth Embodiment)

The fifth embodiment of the present invention will now be described. Note that, in the description given below, the same descriptive symbols are used for portions that are the same as in the first embodiment and a description thereof is omitted. Only those portions that differ from the first embodiment are described here.

Figure 11:
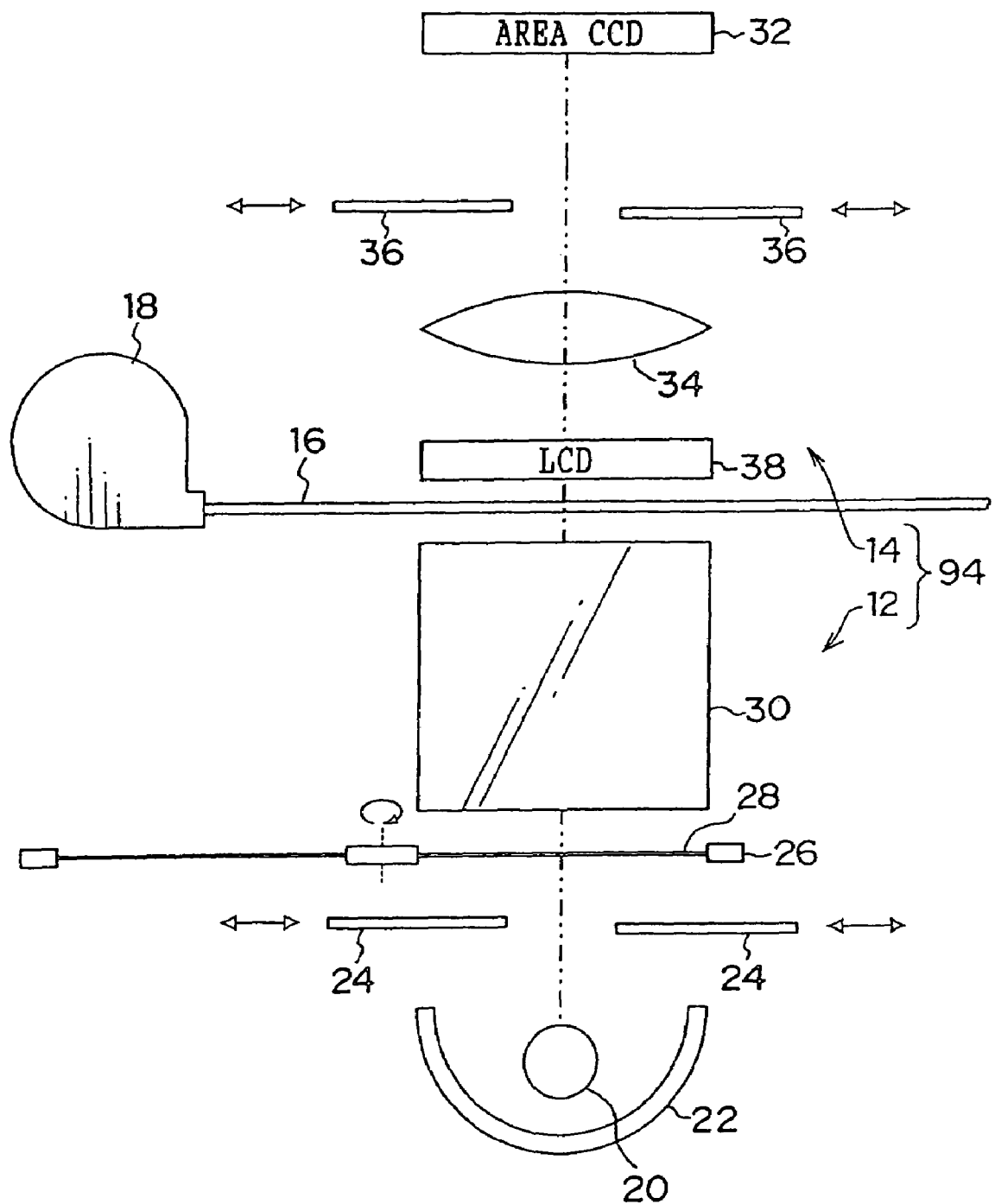
FIG. 11 is a side view showing the schematic structure of the optical system of a film scanner according to the fifth embodiment.

As is shown in FIG. 11, in the film scanner 94 according to the fifth embodiment, an LCD 38 which corresponds to the incident light amount alteration apparatus described in the third aspect is provided between the photographic film 16 and the lens 34. Note that the lens 38 is positioned in close proximity to the photographic film 16 with the purpose of reducing, during the reading of the film image, the amount of incident light on each of those photoelectric conversion cells which correspond to areas on the photographic film 16 where no image is recorded out of all the photoelectric conversion cells of the area CCD 32.

The control section 46 according to the fifth embodiment is provided with unillustrated non-volatile memory (which may comprise an EEPROM capable of having the storage contents thereof rewritten or RAM connected to a backup power supply, or may comprise Rom whose storage contents cannot be rewritten). Reading apparatus shading correction data SCANSHADE$_{ij}$ and camera shading correction data CAMERASHADE$_{ij}$ are stored in the non-volatile memory.

The lamp 20 of the light source section 12 is switched on when there is no photographic film 16 set in the film scanner 94. When a fixed time, in which saturation of the accumulated charge in each photoelectric conversion cell is not generated, is set as the charge accumulation time in the area CCD 32, the amount of the charge accumulated in each photoelectric conversion cell of the area CCD 32 varies for each photoelectric conversion cell. These irregularities in the accumulated charge amounts are caused by the film scanner 94 (more specifically, by factors such as unevenness in the amount of light emitted from the light source section 12 of the film scanner 94 and aberrations in the lens 34 (peripheral light reduction and the like), and by irregularities in the sensitivity of each of the photoelectric conversion cells of the area CCD 32). Because the results of the image reading are irregular in accordance with these irregularities in the accumulated charge amounts, the irregularities in the accumulated charge amount correspond to the "irregularities in each pixel unit in the results of an image reading caused by the image reading apparatus" of the fifth and eighth aspects.

The reading apparatus shading correction data SCANSHADE$_{ij}$ is data for controlling the light transmission ratios of each LCD cell of the LCD 38 such that a fixed charge amount is accumulated in each photoelectric conversion cell of the area CCD 32 when the irregularities in the accumulated charge amounts caused by the film scanner 94 are corrected and no photographic film 16 has been set in the film scanner 94. The reading apparatus shading correction data SCANSHADE$_{ij}$ is set, when no photographic film 16 is set in the film scanner 94, based on irregularities in the accumulated charges for each photoelectric conversion cell of the area CCD 32 represented by data output from the area CCD 32 via the amplifier 40 and the A/D converter 42.

Density unevenness caused by the camera (more specifically, by aberrations in the optical system of the camera such as peripheral light reduction) used when recording an image by photography also occurs in film images recorded on a photographic film. Due to the density unevenness in the film image, the amount of charge accumulated in each photoelectric conversion cell of the area CCD 32 when reading the film image is also irregular relative to the charge amount which corresponds to the photographed object recorded on the photographic film 16 by photography. These irregularities in the accumulated charge amount for each photoelectric conversion cell of the area CCD 32 caused by density unevenness in the film image correspond to the "irregularities in each pixel unit in the results of an image reading caused by the density unevenness in the image being read" described in the fifth and eighth aspects.

The camera shading correction data CAMERASHADE$_{ij}$ is data for controlling the light transmission ratios of each LCD cell of the LCD 38 such that irregularities in the charge accumulation time in each photoelectric conversion cell of the area CCD 32 (irregularities in the amount of incident light on the area CCD 32) due to density unevenness caused by the camera used when recording an image by photography are corrected. The camera shading correction data CAMERASHADE$_{ij}$ is set for each of a variety of lenses based on the results of the measurements of variations between the various lenses in the amount of light (amount of exposure light) received at each position on the photographic film caused by the camera lens when recording an image by photography using a camera. The camera shading correction data CAMERASHADE$_{ij}$ is stored in the non-volatile memory together with the corresponding information representing the lens type.

Note that, if the light transmission ratio of a single LCD cell of the LCD 38 is changed, the amount of incident light on the plurality of photoelectric conversion cells of the area CCD 32 which correspond to the single LCD cell also change. However, because the irregularities in the accumulated charge amounts of each photoelectric conversion cell of the area CCD 32 caused by the film scanner 94 and density unevenness in the image are gentle, low frequency variations, the irregularities in the above accumulated charge amount can be corrected with a high degree of accuracy by changing the light transmission ratios for each single LCD cell of the LCD 38 and changing the amount of incident light in units of the plurality of photoelectric conversion cells of the area CCD 32 which correspond to the single LCD cell.

Moreover, during the reading of the film image, areas of the light receiving surface of the area CCD 32 irradiated by light which has passed through areas of the photographic film 16 on which an image has been recorded vary in accordance with the size and aspect ratio of the image being read, and with the magnification of the reading. In the present embodiment, because the reading magnification is fixed for the size and aspect ratio of each film image being read, areas of the light receiving surface of the area CCD 32 irradiated by light which has passed through areas on which an image has been recorded (light receiving areas corresponding to image recording areas) vary in accordance with the size and aspect ratio of the image being read.

However, areas of the photographic film 16 on which no image has been recorded, have a lower density than areas on which images have been recorded when the photographic film 16 is a negative film, for example. Therefore, saturation in the accumulated charge occurs in the photoelectric conversion cells of areas of the light receiving surface of the area CCD 32 irradiated by light which has passed through areas of the photographic film 16 on which an image has been recorded (light receiving areas corresponding to image recording areas) when reading a film image.

Note that, even if the photographic film 16 being read is a reversal film, when the photographic film 16 is transported using a film carrier capable of transporting photographic film of a larger size than the photographic film 16 whose film images are being read, because the size of the aperture through which light passes from the lamp 20 of the light source section 12 is too large for the size of the film image, a portion of the light which passes through the aperture strikes the area CCD 32 without passing through the photographic film 16 being read (i.e. the amount of light is not reduced by the photographic film 16). As a result, saturation occurs in the accumulated charge in the photoelectric conversion cells of light receiving areas corresponding to non-image recording areas.

Therefore, in the fifth embodiment, the occurrence of saturation in the accumulated charge in the photoelectric conversion cells of light receiving areas corresponding to non-image recording areas is prevented by setting the light transmission ratio of the corresponding LCD cells of the LCD 38 to a predetermined value or less. For this reason, LCD cell identification data for identifying from among each of the LCD cells of the LCD 38 those LCD cells corresponding to non-image recorded areas is stored in advance in the non-volatile memory so as to correspond to the information representing the size and aspect ratio of the film image.

The reading of a film image in the fifth embodiment will now be described. In the fifth embodiment, whenever the light transmission ratio of each LCD cell in the LCD 38 is controlled during the prescan of a film image (step 110 in the flow chart in FIG. 3 and FIG. 4), firstly the reading apparatus shading correction data $SCANSHADE_{ij}$ is fetched from the non-volatile memory and an attempt is made to detect the type of lens used when recording the film image being read by photography.

For example, in a lens-fitted film (referred to below as an LF (also known as a film-fitted lens package)), a characteristic mark expressing the type of LF is recorded during manufacture on a photographic film set in the LF. Therefore, when a characteristic mark is recorded on the photographic film 16, it is possible to specify the type of LF used to photograph and record images on the photographic film 16 based on the characteristic mark. It is then possible to detect the type of lens used to photograph and record the film images being read based on the type of LF.

Moreover, if the photographic film 16 is a photographic film formed with a transparent magnetic layer (i.e. a 240 size photographic film—known as an APS film), information representing the type of camera and the type of lens can be magnetically recorded on the magnetic layer by the camera when photographing and recording an image on the APS film. Therefore, by reading the information from the magnetic layer when the photographic film 16 is being transported by the film carrier, it is possible to detect the type of lens used when photographing and recording the film image being read.

Further, as described above, when detecting the type of lens used when photographing and recording the film image being read, the camera shading correction data $CAMERASHADE_{ij}$ corresponding to the detected lens type which is recorded in the non-volatile memory is fetched. If the lens type could not be detected, the camera shading correction data $CAMERASHADE_{ij}$ is set at 0 (i.e. no correction occurs).

Next, an attempt is made to detect the size and aspect ratio of the film image being read. Because the size and aspect ratio of a film image are constant in, for example, an APS film, depending on the type of photographic film 16, the detection of the size and aspect ratio may be able to be performed automatically based on the DX code or the like recorded on the photographic film. In a 135 size photographic film, the aspect ratios of the film images may not be constant (for example, full-sized images may be mixed in with panorama-sized images). However, if, for example, an operator specifies the aspect ratio, it is possible to perform the detection based on the specified aspect ratio (because the photographic film size can be detected automatically based on the DX code, if the aspect ratio of a film image can be detected, the size of that film image can be detected automatically). Moreover, as described above, when the aspect ratio and film size of the film image being read have been detected, the LCD cell identification data corresponding to the detected size and aspect ratio stored in the non-volatile memory are fetched.

Next, a differentiation is made based on the fetched LCD cell identification data between those LCD cells of the LCD 38 which correspond to non-image recorded areas and those LCD cells of the LCD 38 which correspond to image recorded areas. The density $DLCD_{ij}$ of each LCD cell of the LCD 38 represented by the LCD density control data is then calculated using the formula below based on the fetched reading apparatus shading correction data $SCANSHADE_{ij}$ and the camera shading correction data $CAMERASHADE_{ij}$.

$$DLCD_{ij} \leftarrow SCANSHADE_{ij} + CAMERASHADE_{ij}$$

(for the density of LCD cells corresponding to image recorded areas) and $$DLCD_{ij} \leftarrow \text{maximum density } DLCD_{max}$$

(for the density of LCD cells corresponding to non-image recorded areas).

By controlling the light transmission ratios of each LCD cell of the LCD 38 based on the above LCD density control data, the occurrence of saturation in an accumulated charge can be prevented because the amount of incident light is reduced in those photoelectric conversion cells of the area CCD 32 which correspond to the non-image recorded areas. At the same time, because the amount of incident light is controlled in those photoelectric conversion cells of the area CCD 32 which correspond to the image recorded areas such that irregularities in the charge accumulation amount caused by density unevenness in the image and the film scanner 94 are corrected, it is possible to read the film image being read with a high degree of accuracy. Note that the control of the light transmission ratio of each LCD cell of the LCD 38 in the above manner corresponds to the second control means described in the fourth and fifth aspects.

There are also cases when the size and aspect ratio of the film image being read are unclear when performing a prescan. In this case, it is not possible to differentiate between those LCD cells which correspond to non-image recorded areas and those LCD cells which correspond to image recorded areas. Consequently, the density $DLCD_{ij}$ of each LCD cell of the LCD 38 represented by the LCD density control data is calculated using the formula below.

$DLCD_{ij} \leftarrow SCANSHADE_{ij} + CAMERASHADE_{ij} + a$ predetermined density D.

When the light transmission ratios of each LCD cell of the LCD 38 are controlled based on the above LCD density control data, although the accuracy of the reading of the film image being read is slightly reduced, it is possible to prevent saturation occurring in the accumulated charge even in each photoelectric conversion cell of the area CCD 32 which corresponds to an LCD cell which could not be differentiated as corresponding to a non-image recorded area.

Furthermore, in the fifth embodiment, each time the light transmission ratio of an LCD cell of the LCD 38 is controlled during the fine scanning of a film image (step 128 in the flow chart shown in FIG. 3 and FIG. 4), the reading apparatus shading correction data $SCANSHADE_{ij}$ and the camera shading correction data $CAMERASHADE_{ij}$ are fetched from the non-volatile memory in the same way as in the prescan. At the same time, based on the size and aspect ratio of the film image being read detected in the prescan, the LCD cell identification data corresponding to that size and aspect ratio are fetched from the non-volatile memory.

Subsequently, based on the LCD cell identification data, a differentiation is made between those LCD cells of the LCD 38 which correspond to non-image recorded areas and those LCD cells of the LCD 38 which correspond to image recorded areas. The density DLCDij of each LCD cell of the LCD 38 represented by the LCD density control data is then calculated using the formula below based on the reading apparatus shading correction data SCANSHADEij and the camera shading correction data CAMERASHADEij.

$DLCD_{ij} \leftarrow PRED_{max} - PRED_{ij} + SCANSHADE_{ij} + CAMERASHADE_{ij}$ (for the density of LCD cells corresponding to image recorded areas) and $DLCD_{ij} \leftarrow$ maximum density $DLCD_{max}$ (for the density of LCD cells corresponding to non-image recorded areas).

By controlling the light transmission ratios of each LCD cell of the LCD 38 based on the above LCD density control data, the occurrence of saturation in an accumulated charge can be prevented because the amount of incident light is reduced in those photoelectric conversion cells of the area CCD 32 which correspond to the non-image recorded areas. At the same time, because the amount of incident light is controlled in those photoelectric conversion cells of the area CCD 32 which correspond to the image recorded areas such that irregularities in the charge accumulation amount caused by density unevenness in the image and the film scanner 94 are corrected, and because the amount of incident light on each photoelectric cell can be prevented from being too great or too little regardless of the density of each portion of the film image, it is possible to read the film image being read with a high degree of accuracy using the area CCD 32. Note that the control of the light transmission ratio of each LCD cell of the LCD 38 in the above manner corresponds to the second control means described in the fourth and fifth aspects.

(Sixth Embodiment)

The sixth embodiment of the present invention will now be described. Note that the sixth embodiment has substantially the same structure as the third embodiment so the same descriptive symbols are used for portions that are the same as in the first embodiment and a description thereof is omitted. Only those portions that differ from the third embodiment are described here.

The control section 46 according to the sixth embodiment is provided with unillustrated non-volatile memory in the same way as in the fifth embodiment. Reading apparatus shading correction data $SCANSHADE_{mn}$ and the camera shading correction data $CAMERASHADE_{mn}$ are stored in the non-volatile memory.

The reading apparatus shading correction data $SCANSHADE_{mn}$ according to the sixth embodiment is data for correcting the charge accumulation times of each photoelectric conversion cell of the area CCD 72 so that irregularities in the accumulated charge amounts of each photoelectric conversion cell of the area CCD 72 caused by the film scanner are corrected. The reading apparatus shading correction data $SCANSHADE_{ij}$ is set, when no photographic film 16 is set in the film scanner, based on irregularities in the accumulated charges for each photoelectric conversion cell of the area CCD 72 represented by data output from the area CCD 72 via the amplifier 40 and the A/D converter 42.

The camera shading correction data $CAMERASHADE_{ij}$, according to the sixth embodiment, is data for correcting the charge accumulation times of each photoelectric conversion cell of the area CCD 72 so that irregularities in the accumulated charge amounts of each photoelectric conversion cell of the area CCD 72 due to density unevenness caused by the camera used when recording an image by photography are corrected. The camera shading correction data CAMERASHADEij is set for each of a variety of lenses based on the results of the measurements of variations between the various lenses in the amount of light (amount of exposure light) received at each position on the photographic film caused by the camera lens when recording an image by photography using a camera. The camera shading correction data CAMERASHADEij is stored in the non-volatile memory together with the corresponding information representing the lens type.

As a result, in the sixth embodiment, the occurrence of saturation in the accumulated charge of those photoelectric conversion cells of the area CCD 72 which are photoelectric conversion cells of light receiving areas corresponding to non-image recorded areas is prevented by setting the charge accumulation times of these photoelectric conversion cells to a predetermined time or less. For this reason, photoelectric conversion cell identification data for identifying from among each of the photoelectric conversion cells of the area CCD 72 those photoelectric conversion cells corresponding to non-image recorded areas is stored in advance in the non-volatile memory so as to correspond to the information representing the size and aspect ratio of the film image.

The reading of a film image in the sixth embodiment will now be described. In the sixth embodiment, whenever the charge accumulation time of each photoelectric conversion cell in the area CCD 72 is set during the prescan of a film image, in the same way as in the fifth embodiment, the reading apparatus shading correction data $SCANSHADE_{ij}$ is fetched from the non-volatile memory and an attempt is made to detect the type of lens used when recording the film image being read by photography. The camera shading correction data $CAMERASHADE_{ij}$ corresponding to the detected lens type which is recorded in the non-volatile memory is fetched (if the lens type could not be detected, the camera shading correction data $CAMERASHADE_{ij}$ is set at 0 (i.e. no correction occurs)). The photoelectric cell conversion cell identification data corresponding to the detected size and aspect ratio stored in the non-volatile memory is then fetched.

The charge accumulation times of each photoelectric conversion cell of the area CCD 72 for the prescan are then set in the following manner. Based on the fetched photoelectric conversion cell identification data, a differentiation is made between those photoelectric conversion cells of the area CCD 72 which correspond to non-image recorded areas and those photoelectric conversion cells of the area CCD 72 which correspond to image recorded areas. The charge accumulation times of those photoelectric conversion cells which correspond to non-image recorded areas are then set at an extremely short time (the time may even be set at 0). On the other hand, the predetermined charge accumulation times of those photoelectric conversion cells which correspond to image recorded areas are then corrected in accordance with the fetched reading apparatus shading correction data $SCANSHADE_{mn}$ and the camera shading correction data $CAMERASHADE_{mn}$. Moreover, the charge accumulation times of set for each photoelectric conversion cell of the area CCD 72 are input into the CCD driver 54.

The CCD driver 54 generates electronic shutter control signals for each photoelectric conversion cell such that only the charges generated in each photoelectric conversion cell within the period corresponding to the input charge accumulation times are accumulated in each photoelectric conversion cell, and outputs these electronic shutter control signals to the area CCD 72 (this processing corresponds to the second control means described in the sixth aspect).

As a result of the above, the occurrence of saturation in an accumulated charge can be prevented because the charge accumulation times are made extremely short in those photoelectric conversion cells of the area CCD 72 which correspond to non-image recorded areas. At the same time, because the charge accumulation times are controlled in those photoelectric conversion cells of the area CCD 72 which correspond to the image recorded areas such that irregularities in the charge accumulation amount caused by density unevenness in the image and the film scanner 94 are corrected, it is possible to read the film image being read with a high degree of accuracy. Note that the control of the charge accumulation time of each photoelectric conversion cell of the area CCD 72 in the above manner corresponds to the second control means described in the seventh and eighth aspects.

If, however, the size and aspect ratio of the film image being read are unclear, the charge accumulation times of all the photoelectric conversion cells of the area CCD 72 are shortened by a predetermined time. As a result, although the accuracy of the reading of the image being read is slightly diminished, it possible to ensure that saturation does not occur in the accumulated charge in each photoelectric conversion cell even when the photoelectric conversion cells which correspond to non-image recorded areas are unclear.

Furthermore, in the sixth embodiment, each time the charge accumulation time of a photoelectric conversion cell of the area CCD 72 is set during the fine scanning of a film image, the reading apparatus shading correction data $SCANSHADE_{ij}$ and the camera shading correction data $CAMERASHADE_{ij}$ are fetched from the non-volatile memory in the same way as in the prescan. At the same time, based on the size and aspect ratio of the film image being read detected in the prescan, the photoelectric conversion cell identification data corresponding to that size and aspect ratio are fetched from the non-volatile memory.

The charge accumulation times are then set for each photoelectric conversion cell of the area CCD 72 in the manner described below. Based on the fetched photoelectric conversion cell identification data, a differentiation is made between those photoelectric conversion cells of the area CCD 72 which correspond to non-image recorded areas and those photoelectric conversion cells of the area CCD 72 which correspond to image recorded areas. The charge accumulation times of those photoelectric conversion cells which correspond to non-image recorded areas are then set at an extremely short time (for example, at 0). Moreover, the charge accumulation times of those photoelectric conversion cells which correspond to non-image recorded areas are then set so as to become longer as the density value of the pixel increases, based on the density value of each pixel of the film image represented by the prescan image data. Thereafter, the set charge accumulation times are corrected in accordance with the fetched reading apparatus shading correction data $SCANSHADE_{mn}$ and the camera shading correction data $CAMERASHADE_{mn}$.

By controlling the charge accumulation times in each of the photoelectric conversion cells of the area CCD 72 in accordance with the above charge accumulation times, the occurrence of saturation in an accumulated charge can be prevented because the charge accumulation times are made extremely short in those photoelectric conversion cells of the area CCD 72 which correspond to non-image recorded areas. Moreover, by controlling the charge accumulation times for those photoelectric conversion cells of the of the area CCD 72 which correspond to image recorded areas such that irregularities in the accumulated charge amount caused by density unevenness in the image and the film scanner are corrected and such that saturation of the accumulated charge and the accumulated charge being too small are prevented, it is possible to read a film image with the area CCD 72 with a high degree of accuracy. Note that the control of the charge accumulation time of each photoelectric conversion cell of the area CCD 72 in the above manner corresponds to the second control means described in the seventh and eighth aspects.

Note that, in the first through third embodiments, the prescan and the fine scan were both performed by the same reading sensor, however, the present invention is not limited to this. For example, as is shown in FIG. 11, a second film scanner 90 (image reading apparatus) equipped with a lamp 80, a reflector 82, a diaphragm 84, a lens 86, and a line sensor 88 (or, alternatively, an area sensor) may be provided and the prescan performed using this second film scanner 90 with the fine scan being performed by the film scanner 10. Naturally, it is also possible to combine the second film scanner 90 with the film scanner 60 described in the second embodiment and the film scanner 70 described in the third embodiment.

Figure 14:
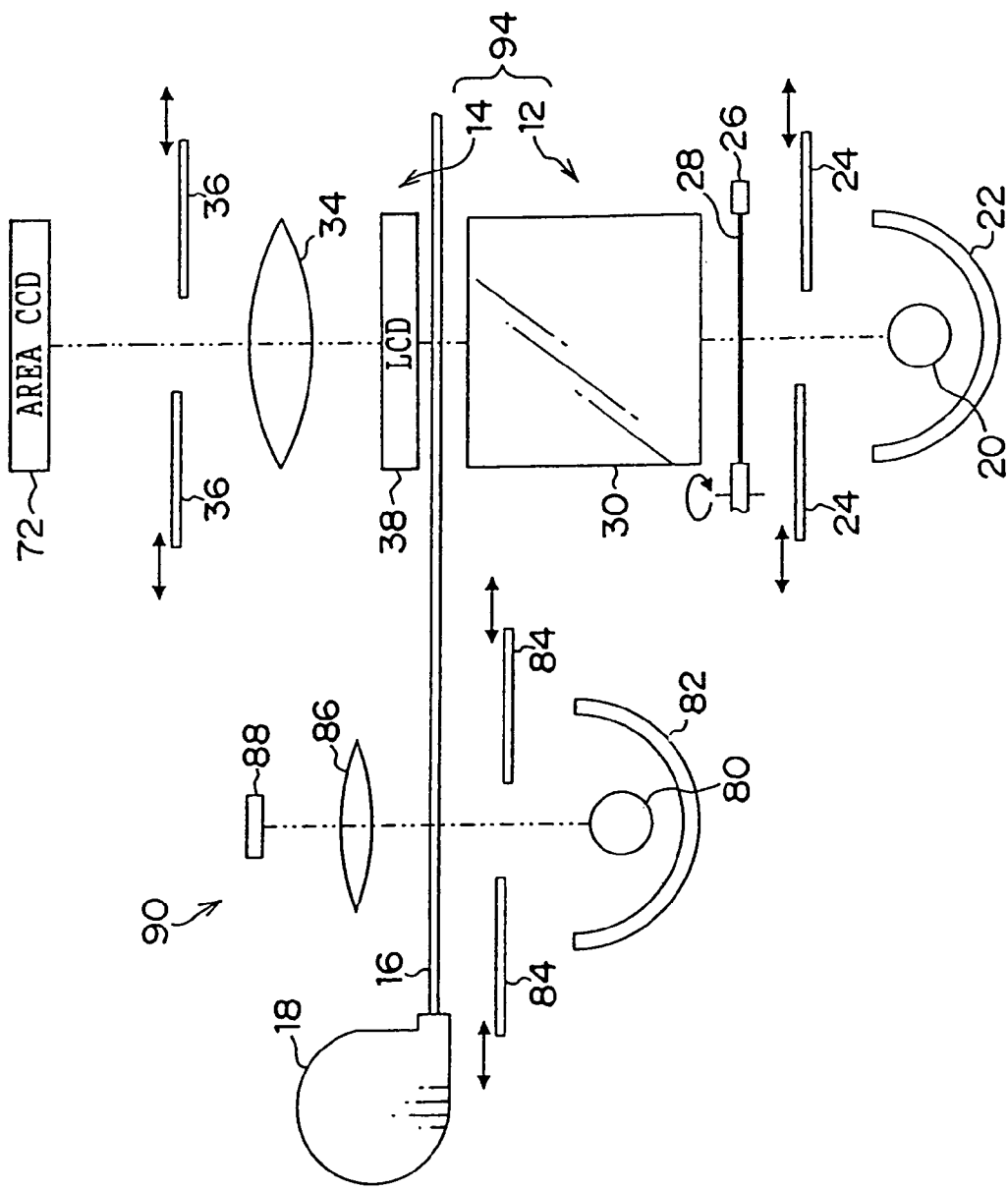
FIG. 14 is a side view showing the schematic structure of the optical system of a film scanner according to yet a further embodiment.

Moreover, in the fourth embodiment, the amount of illumination light on the film image was gradually increased, however, the present invention is not limited to this, and the film image may be read several times with the amount of illumination light starting at the maximum amount and then gradually being decreased. In this case, the data at the point when saturation of the accumulated charge stopped in cells in which saturation of the accumulated charge had occurred originally may be stored as output pixel data. Furthermore, when adjusting the amount of incident light on the reading sensor, instead of moving the light source diaphragm 24, it is possible to move the lens diaphragm 36. Alternatively, it is possible to move both the light source diaphragm 24 and the lens diaphragm 36. Moreover, in the fifth embodiment, a description was given for when the fourth and fifth aspects of the present invention were applied to a film scanner having the structure described in the first embodiment (i.e. a structure in which the area CCD 32 was used as the reading sensor), however, the present invention is not limited to this. For example, as is shown in FIG. 13, the fourth and fifth aspects of the present invention may be applied to a film scanner having the structure described in the second embodiment (i.e. a structure in which the linear CCD 62 was used as the reading sensor) or to a film scanner having a structure in which the prescan and fine scan are performed by different reading sensors, an example of which is shown in FIG. 14. In FIG. 14, an LCD has not been provided in the optical system corresponding to the linear sensor 88 for performing prescans, however, it is of course possible to provide an LCD in the optical system and apply the fourth and fifth aspects of the present invention, as described in the fifth embodiment.

Furthermore, in the sixth embodiment as well, a description was given for when the seventh and eighth aspects of the present invention were applied to a film scanner having the structure described in the third embodiment (i.e. a structure in which the area CCD 72 was used as the reading sensor), however, the present invention is not limited to this. For example, the seventh and eighth aspects of the present invention may be applied to a film scanner having the structure in which a linear CCD was used as the reading sensor, as in the second embodiment, or to a film scanner having a structure in which the prescan and fine scan are performed by different reading sensors.

Moreover, in the examples described above, a CCD sensor was used as the reading sensor, however, the present invention is not limited to this, and another reading sensor such as, for example, a MOS type image pickup element may be used.

Furthermore, in the above described examples, a photographic film was read, however, the present invention is not limited to this, and the present invention may be applied to a scanner (for example, the scanner in a photocopier) for reading images recorded on recording materials such as photographic printing paper, normal paper, heat sensitive paper, and the like (reflection originals).

As has been described above, according to the first aspect of the present invention, an image to be read is read by photoelectrically converting incident light from the image with the image divided into units of single pixels. Suitable reading conditions for the image are then determined in units of single pixels or in units of small areas comprising a plurality of pixels. Based on the results of this determination, a control processing is performed such that output image data equivalent to that obtained if the image were read under the suitable reading conditions for each pixel unit or small area unit can be obtained from the result of the image reading. As a result, the present invention has the excellent effect that an image can be read at a wide dynamic range while the image reading apparatus can be provided at low cost.

According to the second aspect of the present invention, suitable reading conditions for reading the image are determined for each pixel or for each small area comprising a plurality of pixels based on the results of a reading of the image being read. The reading conditions for each pixel or each small area when the image being read is read by a reading apparatus capable of altering the reading conditions for the image between pixel units and small area units that photoelectrically converts incident light from each pixel of the image are then controlled so as to match the above determined suitable reading conditions. As a result, the present invention has the excellent effect that an image can be read at a wide dynamic range while the image reading apparatus can be provided at low cost.

According to the third aspect of the present invention, in the invention according to the second aspect, the reading apparatus is constructed so as to include a reading sensor and an incident light amount alteration apparatus capable of altering the amount of incident light striking the reading sensor in units of single pixels or in units of small areas. The reading conditions are controlled by independently controlling in units of single pixels or small areas the amount of incident light striking the reading sensor using the incident light amount alteration-apparatus. As a result, in addition to the above effects, the effect is achieved that the need to use a reading sensor having a complicated structure no longer exists.

According to the fourth aspect of the present invention, in the invention according to the third aspect, the amount of incident light on the reading sensor is controlled in units of single pixels or small areas by the incident light amount alteration apparatus such that the -amount of incident light on the reading sensor other than from the image being read is less than a predetermined value. As a result, in addition to the above effects, the effect is achieved that the structure is not made more complex such as by providing a mask or the like and incident light other than from the image being read can be prevented from having an adverse effect on the reading of the image.

According to the fifth aspect of the present invention, in the invention according to the third aspect, the amount of incident light on the reading sensor is controlled in units of pixels or small areas using the incident light amount alteration apparatus such that density unevenness in an image being read and irregularities in each pixel unit in the results of an image reading by a reading sensor caused by the image reading apparatus are corrected. As a result, in addition to the above effects, the effect is achieved that irregularities in each pixel unit in the results of an image reading by a reading sensor can be avoided and there is no need to perform correction processing to correct the results in each pixel unit of an image reading.

According to the sixth aspect of the present invention, in the invention according to the second aspect, the reading apparatus is constructed so as to include a charge accumulation type reading sensor capable of independently altering charge accumulation times in units of single pixels or small areas. Because the reading conditions are controlled by independently controlling the charge accumulation times of the reading sensor in units of single pixels or small areas, in addition to the above effects, the effect is achieved that the number of parts can be reduced.

According to the seventh aspect of the present invention, in the invention according to the sixth aspect, the charge accumulation times in the reading sensor are controlled in units of single pixels or small areas such that the charge accumulation times in the photoelectric conversion of incident light on the reading sensor other than from the image being read is less than a predetermined value. As a result, in addition to the above effects, the effect is achieved that the structure is not made more complex such as by providing a mask or the like and incident light other than from the image being read can be prevented from having an adverse effect on the reading of the image.

According to the eighth aspect of the present invention, in the invention according to the sixth aspect, the charge accumulation times of the reading sensor are controlled in units of pixels or small areas such that density unevenness in an image being read and irregularities in each pixel unit in the results of an image reading by a reading sensor caused by the image reading apparatus are corrected. As a result, in addition to the above effects, the effect is achieved that irregularities in each pixel unit in the results of an image reading by a reading sensor can be avoided and there is no need to perform correction processing to correct the results in each pixel unit of an image reading.

According to the ninth aspect of the present invention, in the invention according to the third or sixth aspects, the reading conditions are controlled by controlling an amount of light using a light amount control apparatus capable of adjusting the amounts of light of at least one of illumination light for illuminating the image and incident light incident from the image on the reading sensor. As a result, in addition to the above effects, the additional effects are achieved that the width of the alteration of the amount of incident light by the incident light amount alteration apparatus or the width of the alteration of the charge accumulation time by the reading sensor can be reduced. Moreover, any increase in the number of parts can be avoided.

According to the tenth aspect of the present invention, the image being read is read a plurality of times by photoelectrically converting incident light from the image in units of single pixels. At the same time, the reading conditions are made different for each reading by adjusting the amount of incident light. The most suitable reading conditions are then determined for each pixel or for each small area comprising a plurality of pixels from among the reading conditions for the plurality of image readings. Data corresponding to the most suitable reading conditions is then selected for each pixel or each small area from the image data obtained from each of the plurality of image readings and is synthesized as output image data. As a result, the present invention has the excellent effect that an image can be read at a wide dynamic range while the image reading apparatus can be provided at low cost.

According to the eleventh aspect of the present invention, from the results of reading the image to be read by photoelectrically converting incident light from the image in units of single pixels, suitable reading conditions for the image to be read are determined for each pixel or for each small area comprising a plurality of pixels. Based on the results of this determination, control is performed so that output image data equivalent to if the image were read under suitable reading conditions for each pixel unit or each small area unit is obtained As a result, the excellent effect is achieved that an image can be read at a wide dynamic range without there being any need for major increases in the cost of the reading apparatus.

What is claimed is:

1. An image reading apparatus comprising:
    a reading apparatus for separating an image to be read into a plurality of pixels and reading the image as signals by photoelectrically converting incident light from each pixel of the image;
    determination device for determining suitable reading conditions for each pixel or for each of small areas comprising a plurality of the pixels, based on signals read by the reading apparatus; and
    a control apparatus for performing control so as to obtain signals identical to signals obtained when each pixel or each small area of the image is read under the reading conditions determined by the determination device,
    wherein the determination device sets reading conditions in which an amount of incident light is as large as possible without saturation of a photoelectric conversion output occurring as suitable reading conditions.

2. The image reading apparatus according to claim 1, wherein the reading apparatus is able to change image reading conditions for each of the pixels and for each of the small areas, and wherein the control apparatus performs control such that the reading conditions determined by the determination device are set as the reading conditions for the reading apparatus.

3. An image reading method comprising the following steps:
    (a) a step in which an image to be read is divided into a plurality of pixels and the image is read as signals by photoelectrically converting incident light from the image for each pixel;
    (b) a step in which suitable reading conditions are determined for each of the pixels or each of the small areas comprising a plurality of pixels based on signals read in step (a); and
    (c) a step in which control is performed using the reading conditions determined in step (b) such that signals equivalent to signals obtained if The image were read under the reading conditions for each of the pixels or small areas are obtained,
    wherein, in step (b), reading conditions in which an amount of incident light is as large as possible without saturation of a photoelectric conversion output occurring are set as suitable reading conditions.

4. The image reading method according to claim 3, wherein, in step (a), image reading conditions can be altered for each of the pixels or each of the small areas, and wherein, in step (c), the suitable reading conditions determined in step (b) are controlled so as to be set as the reading conditions for step (a).

5. An image reading apparatus comprising:
    a reading apparatus for separating an image to be read into a plurality of pixels and reading the image as signals by photoelectrically converting incident light from each pixel of the image;
    determination device for determining suitable reading conditions for each pixel or for each of small areas comprising a plurality of the pixels, based on signals read by the reading apparatus; and
    a control apparatus for performing control so as to obtain signals identical to signals obtained when each pixel or each small area of the image is read under the reading conditions determined by the determination device,
    wherein the determination device determining a first reading condition for a first pixel or for a first small area and a second reading condition for a second pixel or for a second small area, independently of the first reading condition, based on signals read by the reading apparatus; and the control apparatus for performing control so as to obtain signals identical to signals obtained when the first pixel or the first small area is read under the first reading condition and the second pixel or the second small area is read under the second reading condition.

6. An image reading apparatus comprising:
    a reading apparatus for separating an image to be read into a plurality of pixels and reading the image as signals by photoelectrically convening incident light from each pixel of the image;

determination device for determining suitable reading conditions for each pixel or for each of small areas comprising a plurality of the pixels, based on signals read by the reading apparatus; and a control apparatus for performing control so as to obtain signals identical to signals obtained when each pixel or each small area of the image is read under the reading conditions determined by the determination device, wherein the image reading apparatus further comprises a reading sensor for reading the image by photoelectrically converting incident light from the image for each pixel, and an incident light amount alteration apparatus capable of altering the amount of incident light on the reading sensor for each pixel or for each small area, wherein the control apparatus performs control such that the amount of incident light striking the reading sensor via the incident light amount alteration apparatus matches the reading conditions for each of the pixels or for each of the small areas.

7. The image reading apparatus according to claim 1, wherein the image reading apparatus further comprises a reading sensor for reading the image by photoelectrically converting incident light from the image for each pixel, and an incident light amount alteration apparatus capable of altering the amount of incident light on the reading sensor for each pixel or for each small area, wherein the control apparatus performs control such that the amount of incident light striking the reading sensor via the incident light amount alteration apparatus matches the reading conditions for each of the pixels or for each of the small areas.

8. An image reading method comprising the following steps:

(a) a step in which an Image to be read is divided into a plurality of pixels and the image is read as signals by photoelectrically converting incident light from the image for each pixel;

(b) a step in which suitable reading conditions are determined for each of the pixels or each of the small areas comprising a plurality of pixels based on signals read in step (a); and (c) a step in which control is performed using the reading conditions determined in step (b) such that signals equivalent to signals obtained if the image were read under the reading conditions for each of the pixels or small areas are obtained, wherein step (a) includes a step in which the image is read by photoelectrically converting incident light from the image for each pixel using a reading sensor, and a step in which an amount of incident light on the reading sensor is altered by an incident light amount alteration apparatus for each of the pixels or small areas, and wherein, in step (e), an amount of incident light striking the reading sensor via the incident light amount alteration apparatus is controlled so as to match the reading conditions for each of the pixels or small areas.

9. The image reading method according to claim 3, wherein step (a) includes a step in which the image is read by photoelectrically converting incident light from the image for each pixel using a reading sensor, and a step in which an amount of incident light on the reading sensor is altered by the incident light amount alteration apparatus for each of the pixels or small areas, and wherein, in step (c), an amount of incident light striking the reading sensor via the incident light amount alteration apparatus is controlled so as to match the reading conditions for each of the pixels or small areas.

* * * * *